United States Patent
Duron et al.

(10) Patent No.: US 7,228,240 B2
(45) Date of Patent: Jun. 5, 2007

(54) DEVICE AND METHOD FOR DETERMINING AND DETECTING THE ONSET OF STRUCTURAL COLLAPSE

(76) Inventors: Ziyad Duron, 4406 Live Oak Dr., Claremont, CA (US) 91711; Loland Alex Pranger, 18609 Phoebe Way, Gaithersburg, MD (US) 20879; Nicolas von Gersdorff, 12720 Esworthy Rd., North Potomac, MD (US) 20878; Eric Flynn, 6021 E. Heam Rd., Scottsdale, AZ (US) 85254; Angela Cho, 21577 Running Branch Rd., Diamond Bar, CA (US) 91765; Debbie Meduna, 7642 N. Citrus, Waddell, AZ (US) 85355; Mary S. Bogucki, 17 8th Ave., Branford, CT (US) 06405

( * ) Notice: Subject to any disclaimer, the term of this patent is extended or adjusted under 35 U.S.C. 154(b) by 0 days.

(21) Appl. No.: 10/942,626

(22) Filed: Sep. 16, 2004

(65) Prior Publication Data

US 2005/0125197 A1 Jun. 9, 2005

Related U.S. Application Data

(63) Continuation-in-part of application No. 10/081,649, filed on Feb. 21, 2002, now Pat. No. 6,807,862.

(51) Int. Cl.
*G06F 19/00* (2006.01)
*G06F 11/30* (2006.01)

(52) U.S. Cl. .......................... 702/34; 73/579; 73/587; 73/649; 340/870.11; 702/35; 702/182

(58) Field of Classification Search ............ 702/34–36, 702/182, 17, 66–67; 73/493, 579, 587, 649; 340/870.11; 108/169, 170, 173, 174, 175
See application file for complete search history.

(56) References Cited

U.S. PATENT DOCUMENTS

| | | | | |
|---|---|---|---|---|
| 5,195,046 | A | * | 3/1993 | Gerardi et al. ................. 702/35 |
| 5,526,694 | A | * | 6/1996 | McEachern et al. ........... 73/587 |
| 6,192,758 | B1 | * | 2/2001 | Huang .......................... 73/579 |
| 6,292,108 | B1 | * | 9/2001 | Straser et al. .......... 340/870.11 |

* cited by examiner

*Primary Examiner*—John Barlow
*Assistant Examiner*—John Le
(74) *Attorney, Agent, or Firm*—Abanti Bhattacharyya, Esq.; Bartunek & Bhattacharyya, Ltd.

(57) ABSTRACT

A significant number of rescue workers are killed or injured each year as they conduct searches within damaged or burning structures, unaware that the structure is in imminent danger of collapse. The present invention provides a system and method for detecting and monitoring structural damages which are irreversible and which lead to inevitable collapse of a building or structure. The system includes at least one accelerometer that is housed in a device that is mounted on an exterior surface outside the burn area, and within the reach of the rescue worker. The device communicates with a remote display that provides visual and/or audible signals to indicate imminent collapse of the structure. Additionally, the system includes collapse detecting analysis processes for determining the likelihood of collapse.

13 Claims, 26 Drawing Sheets

DEVICE AND METHOD FOR DETERMINING AND DETECTING THE ONSET OF STRUCTURAL COLLAPSE

This application is a continuation-in-part of U.S. application Ser. No. 10/081,649 filed Feb. 21, 2002, now U.S. Pat. No. 6,807,862.

STATEMENT OF GOVERNMENT INTEREST

As outlined under 37 CFR 401.14(b), the United States government shall have a nonexclusive, nontransferable, irrevocable, paid-up license to practice or have practiced for or on behalf of the United States the subject invention.

BACKGROUND OF THE INVENTION

Structural damage leading to collapse has resulted in injuries and death to rescue workers and others within the vicinity of the collapse. In many rescue operations, the condition of the structure plays a relatively minor role in deciding when and how to enter the structure, particularly if human lives are in danger. The typically complex nature of how damage propagates and may ultimately weaken a structure has made it very difficult to predict imminent collapse. Visual inspections alone, especially during firefighting operations, cannot guarantee detection of mechanisms that could lead to collapse and loss of life. A need exists, therefore, for a technical approach that can monitor structures that are severely damaged and in danger of collapse.

Collapse monitoring, however, is based on the premise that the degree of damage to the structure is so severe that continued exposure to the current loading condition will lead to imminent collapse. A burning structure is, by definition, already damaged due to the fire. The ability to simply detect and track damage mechanism due to fire does not provide a mechanism that will detect impending collapse.

Structural damage detection research is best characterized as using nondestructive testing techniques to determine the behavior of response characteristics under known loading conditions. The selection of the particular testing technique, however, plays a large role in the effectiveness of the detection technique. Prior art damage detection devices and methodologies do not provide nondestructive testing devices and methodologies.

Existing devices that detect damage in structures rely mainly on approaches that induce high frequency or acoustic energy into the structure or that use monitoring devices at critical locations within a structure.

U.S. Pat. No. 5,675,809 to Hawkins, for example, discloses a passive strain gauge that can be mounted to buildings. The gauge emits acoustic waves commensurate with load bearing stress exerted on a building in earthquakes and the like. Similarly, U.S. Pat. No. 5,404,755 to Olson, et al., disclose a method of testing stress in wood and other products using ultrasonic frequencies.

These types of gauges and methodologies operate over a wide frequency range, well beyond those associated with structural resonances. As such, they are not effective in isolating structural response behavior and do not possess the sensitivity required for collapse monitoring.

U.S. Pat. No. 6,138,516 (to Tillman) discloses a device that monitors the amount of shock applied to a location on a structure. The device is a shock detector and utilizes an accelerometer adapted to generate a rectified signal that is compared to a threshold level to produce a high voltage state. Detection of shock on a structure, however, cannot be used for monitoring structural response leading to collapse, particularly since Tillman utilizes a set threshold level below which the device remains in a low voltage state.

The need for determining impending structural failure is significant. The present invention provides a new and unique device and method for determining structural damage and imminent failure, which will help to prevent injuries and save the lives of rescue workers and persons within the realm of a building collapse.

SUMMARY OF THE INVENTION

It is, therefore, an objective of this invention to provide a system and method for determining the onset of collapse of a structure, detecting the progression of the collapse mechanism and detecting severely reduced structural integrity in the aftermath of a condition impacting the structure.

It is another objective of this invention to provide a system that utilizes at least one accelerometer that is capable of measuring acceleration responses down to zero Hz.

It is another objective of this invention to provide a system and method for detecting collapse of a structure using at least one accelerometer that is capable of measuring acceleration responses in at least one axial (x, y, or z) direction, utilizing the device of the present invention.

It is another objective of this invention to provide a system that utilizes a device that can be attached on an exterior surface away from damage conditions where the device is attached perpendicular to the direction of the portion of the structure being monitored.

It is yet another objective of this invention to provide a system that utilizes a device that is lightweight, waterproof and capable of withstanding temperatures of up to 1900° F.

It is yet another objective of this invention to provide a system that utilizes a device that operates on an independent power source.

It is yet another objective of this invention to provide a system that utilizes an outside power source including a building's power source that is being monitored for collapse conditions.

It is yet another objective of this invention to provide a system that utilizes analog and/or digital signals to evaluate data transmitted to a remote receiver of the system.

It is yet another objective of this invention to provide a system that utilizes computer technology to evaluate the transmitted signals to determine and detect collapse situations.

It is yet another objective of this invention to provide a system that utilizes wired and wireless communications to transmit signals from the device to the remote receiver.

These and other objects of this present invention are met by this invention as described herein below.

DETAILED DESCRIPTION OF THE EMBODIMENTS

Figure 1:
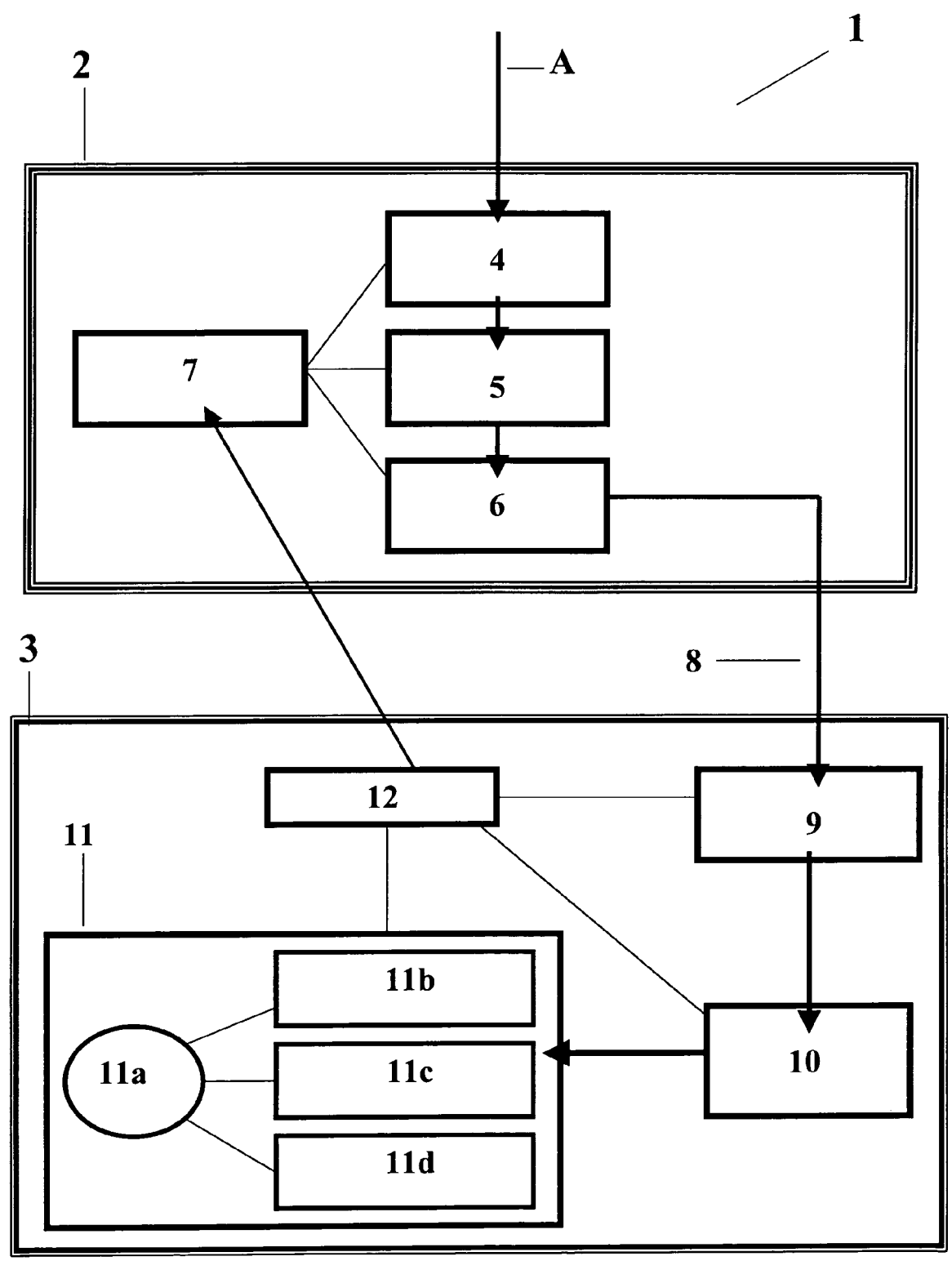
FIG. 1 shows an analog/through cable/wired system of the present invention.

The present invention is directed to the detection of imminent structural collapse. Detection of imminent structural collapse is distinguished from identifying damage detection of structures or buildings. Damage detection is primarily concerned with preventing large scale and sustained damage to a building or structure. Collapse detection, on the other hand, begins with the assumption that damage is irreversible.

All structures exhibit ambient response behavior when subject to naturally occurring excitations that may stem from wind, wave, operating facilities, or other situation specific responses, commensurate with environmental conditions in and around a structure.

The present invention is directed to detecting and monitoring this collapse mechanism as it grows and reaches maximum levels immediately prior to collapse. More specifically, this invention is directed to the determination of a threshold value or range of threshold values based upon naturally occurring and situation specific ambient responses identifying the initiation of a collapse, the progression of the collapse to a condition that indicates severely reduced structural A integrity.

As it pertains to detecting impending collapse of a structure, the irreversible characteristics of a collapse mechanism, coupled with advances in computer and instrumentation technologies, have led to the present invention.

The system and method of the present invention utilizes ambient acceleration response measurements acquired on y the structure due to externally applied excitations of which fire can be one example. The ambient accelerations include information pertaining to response magnitude and frequency content that can be related to the changing integrity of the structure leading to impending collapse. The present invention is capable of detecting low-level structural responses on the order of milli-g's over a frequency range 0–30 Hz and particularly in the range of 0–20 Hz.

The system and method of the present invention is based upon the inventors' findings that acceleration responses are not impacted by fire conditions in the same manner as other structural responses. A simplified physical interpretation of the acceleration response obtained from a collapsing structural component provides a mechanism for inevitable collapse. The collapsing structural component, i.e. a beam, manifests increasing vibration levels near the center of the beam during burn, followed by a large increase in acceleration, oriented in the downward direction, as pieces of the beam fall away. Both the burn and increasing acceleration levels are irreversible processes in the beam. Therefore, detecting the onset of the large increase or change in acceleration is critical to providing sufficient warning of imminent structural collapse. It is important to note that the ability to monitor ambient responses is itself not enough to predict impending collapse. Rather, it is the ability to detect the changes in ambient response levels that distinguishes this present invention.

An example of a situation specific ambient response of a collapse is a burning structure in which fire produces a random excitation that includes spectral energy spanning the traditional structural response range (typically below 100 Hz for most structures). Due to high temperatures and poor signal-to-noise content, detection of structural response under these conditions had previously been difficult.

The present invention provides a system and method for detecting and monitoring a collapse mechanism. The system and method of the present invention is passive. Embodiments of the present invention are shown in FIGS. 1 through 10. The present invention is not limited to these specific embodiments and variations of these embodiments are within the scope of the present invention.

The present system and method is also not limited to fire related collapse, but any collapse induced by structures absorbing energy beyond its load bearding capacities.

FIG. 1 shows an analog through cable wired system of the present invention. The system (1) of FIG. 1 provides a lightweight, portable device (2) and a display apparatus (3) that are utilized to detect and monitor collapse mechanisms at the time of fire or damage.

The device (2) of the system (1) includes at least one accelerometer (4) as a transducer for monitoring structural responses. Accelerometer (4) must be capable of monitoring acceleration in one to three axial directions (i.e., x, y or z axis), preferably oriented perpendicular to a mounting surface, and operates in the range of 0–30 Hz. Accelerometer (4) monitors responses down to DC or zero Hz. This is because accelerometer (4) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (2) also includes a low pass filter and amplifier (5) that is connected to the accelerometer (4) for signal gains equal to 100 over a 0–30 Hz range.

Device (2) also includes at least one transmitter (6) that is connected to the filter and amplifier (5). Bandwidth capabilities of the transmitter (6) shall be specified by the requirements imposed by environmental conditions and the highest desired frequency content in the signal.

The device (2) also includes a first power source (7) that is connected to the accelerometer (4), the filter and amplifier (5) and the transmitter (6). First power source (7) operates using both dependent and independent power supplies. Independent power supplies for the first power source (7) include batteries. The dependent power for power source (7) will be described herein below. Other sources of power adaptable to the device (2) are also within the scope of this invention.

Figure 1A:
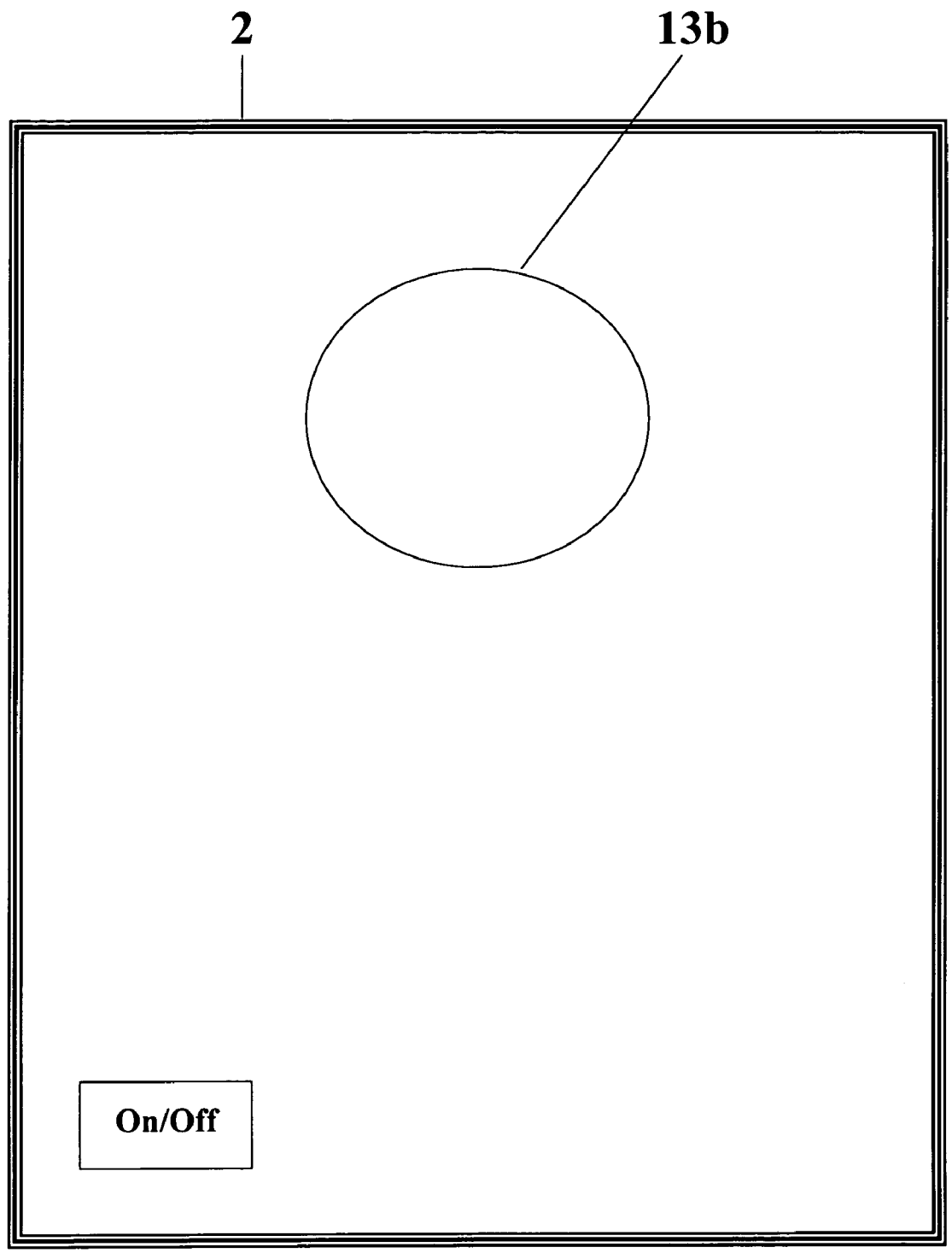
FIG. 1(a) shows a front side of the device of the system.

Transmitter (6) transfers analog response signals obtained from device (2) to the display apparatus (3) through a wired communication line (8). This analog signal is received by a remote receiver (9). The wired communication line (8) is covered with a fire retardant/heat retardant material suitable for high temperatures. The analog signal is then transferred to an A-D converter (10). The A-D converter then transfers the digitized signal to a computer system (11). The computer system (11) includes a computer processor unit (11a), a memory (11b), a display screen (11c) and a user input (11d). The computer processor unit (11a) compares threshold values relating the acceleration responses to structural conditions. Based on these values, computer processor unit (11a) provides a signal to device (2) that is displayed on the on/off indicator (13b) as shown in FIG. 1(a). The digitized signals can be displayed on display screen (11c) and/or stored onto memory (11b). Computer processor unit (11a) also provides on-site data reduction and analysis through designed software that allows for visual and audible characterizations of the measured responses on display (11c). The remote receiver (9), the A-D converter (10) and the computer system (11) are connected to a second power source (12). The second power source (12) can operate utilizing an internal power supply such as batteries. The second power source (12) is also capable of supplying power to first power source (7) when necessary. Other sources of power adaptable to the display apparatus (3) are also within the scope of this invention.

As shown in FIG. (1a), the device (2) is housed within a thermal casing (13) that protects the device (2) from heat damage up to 1900° F. The casing (13) includes a face plate (13a) having an on/off indicator (13b). The on/off indicator (13b) may incorporate a switch mechanism and/or an audio signal indicator and/or a visual signal indicator that is capable of mean tracking. The dimensions of device (2) are dependent upon the size of the various components listed above. However, the largest dimension of device (2) will not exceed 4 inches.

Figure 2:
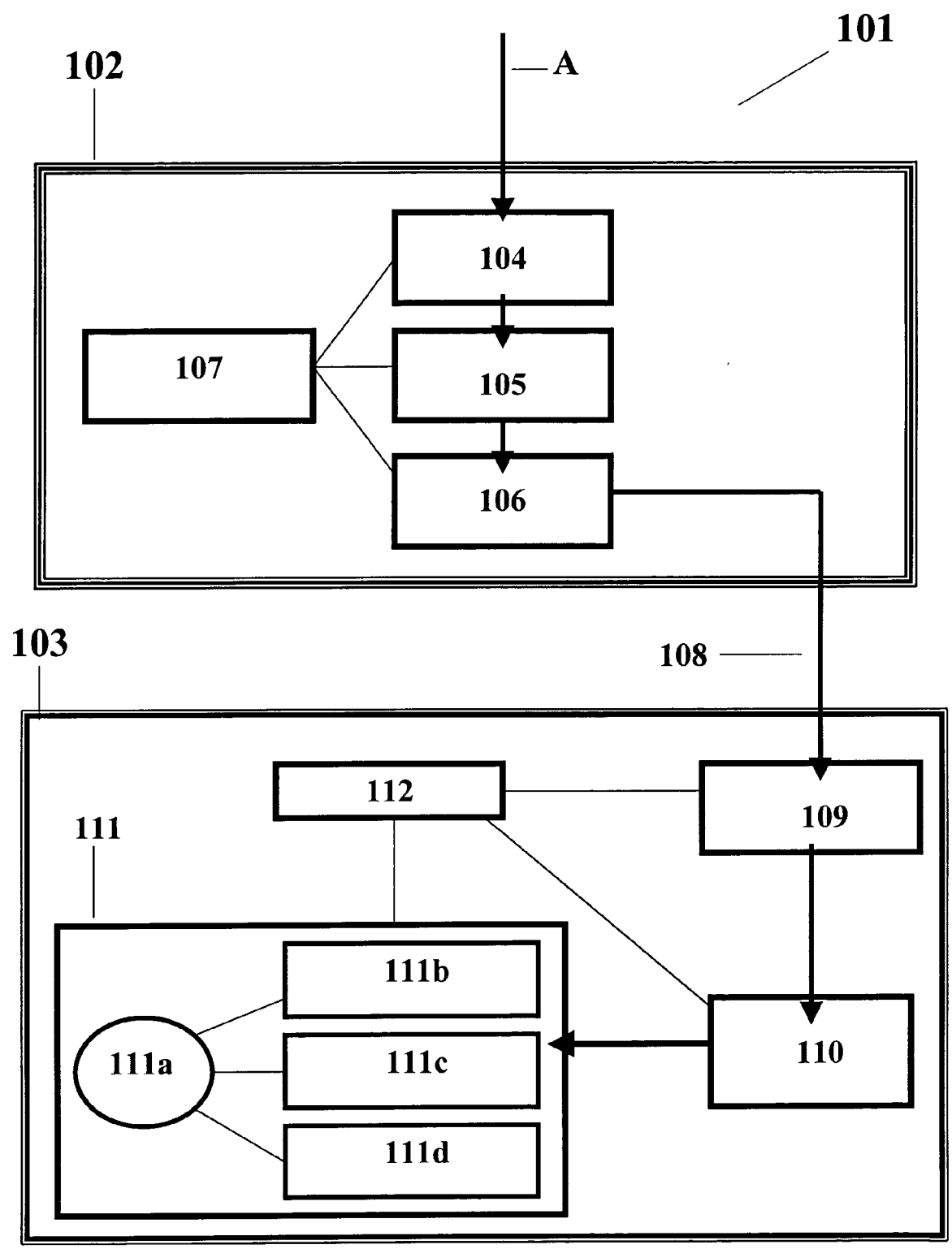
FIG. 2 shows an analog/internal power/wired system of the present invention.

FIG. 2 shows another embodiment of the present invention. System (101) of FIG. 2 provides a lightweight, portable device (102) and a display apparatus (103) that are utilized to detect and monitor collapse conditions at the time of fire or damage. The device (102) of the system (101) includes at least one accelerometer (104) as a transducer for monitoring structural responses. Accelerometer (104) must be capable of monitoring acceleration in one to three axial directions (i.e., x, y or z axis), preferably oriented perpendicular to a mounting surface, and operates in the range of 0–30 Hz. Accelerometer (104) monitors responses down to DC or zero Hz. This is because accelerometer (104) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (102) also includes a low pass filter and amplifier (105) that is connected to the accelerometer (104) for signal gains equal to 100 over a 0–30 Hz range.

Device (102) also includes at least one transmitter (106) that is connected to the filter and amplifier (105). Bandwidth capabilities of the transmitter (106) shall be specified by the requirements imposed by environmental conditions and the highest desired frequency content in the signal.

The device (102) also includes an independent first power source (107) that is connected to the accelerometer (104), the filter and amplifier (105) and the transmitter (106). The first independent power source (107) includes batteries. However, other sources of power adaptable to the device (102) are also within the scope of this invention.

Transmitter (106) transfers analog response signals obtained from device (102) to the display apparatus (103) through a wired communication line (108). This analog signal is received by a remote receiver (109). The wired communication line (108) is covered with a fire retardant/heat retardant material suitable for high temperatures. The analog signal is then transferred to an A-D converter (110). The A-D converter (110) then transfers the digitized signal to a computer system (111). The computer system (111) includes a computer processor unit (111a), a memory (111b), a display screen (111c) and a user input (111d). The computer processor unit (111a) compares threshold values relating the acceleration responses to structural conditions. Based on these values, computer processor unit (111a) provides a signal to device (102) that is displayed on the on/off indicator (13b) as shown in FIG. 1(a). The digitized signals can be displayed on display screen (111c) and/or stored onto memory (111b). Computer processor unit (111a) also provides on-site data reduction and analysis through designed software that allows for visual and audible characterizations of the measured responses on display (111c) The remote receiver (109), the A-D converter (110) and the computer system (111) are connected to a second independent power source (112). The second power source (112) can operate utilizing an internal power supply such as batteries. Other sources of power adaptable to the display apparatus (103) are also within the scope of this invention. The exterior casing and housing for device (102) is as shown in FIG. (1a).

Figure 3:
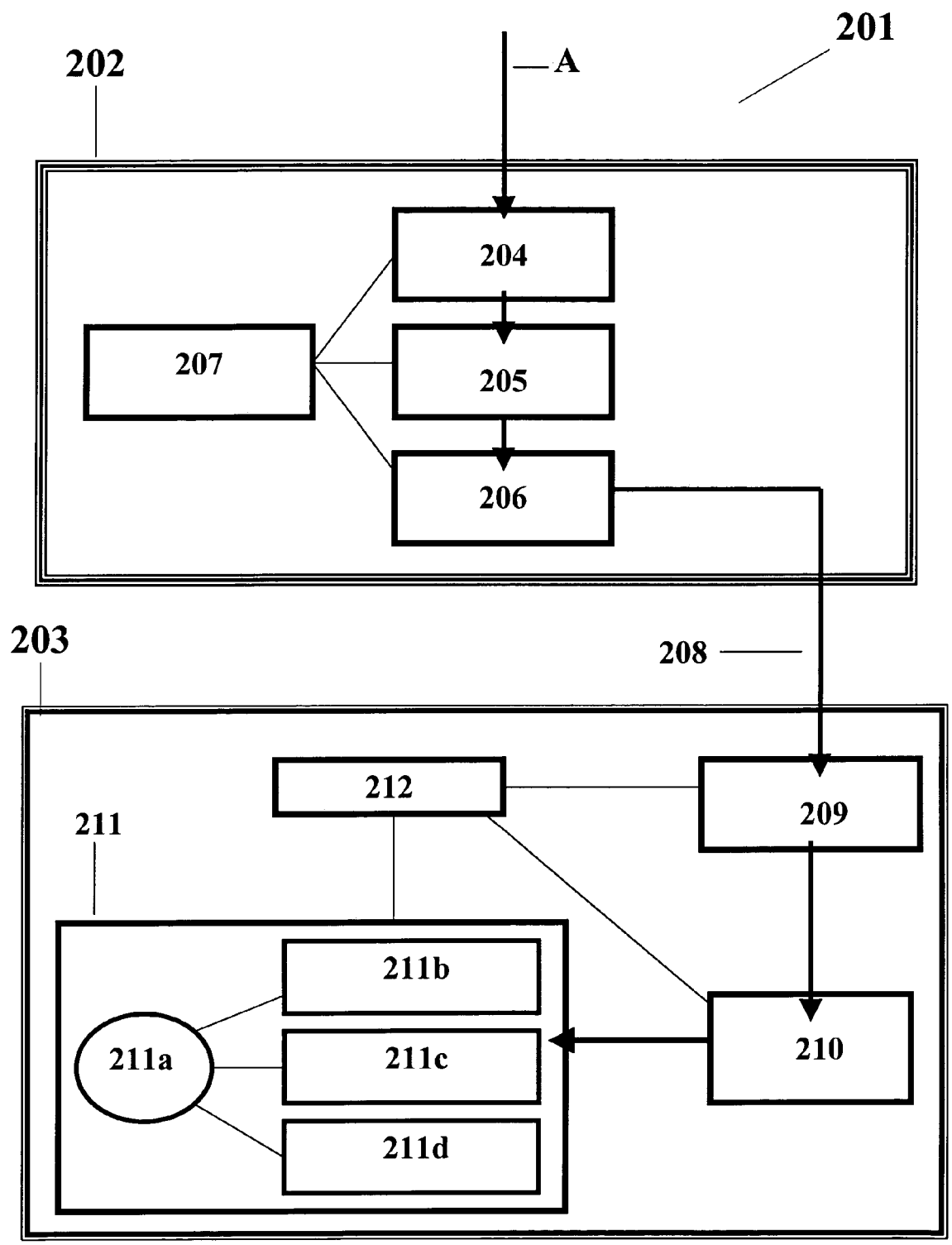
FIG. 3 shows am analog/internal power/wireless system of the present invention.

FIG. 3 shows another embodiment of the present invention. FIG. 3 of the present invention shows a wireless analog internal power system. System (201) of FIG. 3 provides a lightweight, portable device (202) and a display apparatus (203) that are utilized to detect and monitor collapse conditions at the time of fire or damage. The device (202) of the system (201) includes at least one accelerometer (204) as a transducer for monitoring structural responses. Accelerometer (204) must be capable of monitoring acceleration in one to three axial directions (i.e., x, y or z axis), preferably oriented perpendicular to a mounting surface, and operates in the range of 0–30 Hz. Accelerometer (204) monitors responses down to DC or zero Hz. This is because accelerometer (204) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (202) also includes a low pass filter and amplifier (205) that is connected to the accelerometer (204) for signal gains equal to 100 over a 0–30 Hz range.

Device (202) also includes at least one transmitter (206) that is connected to the filter and amplifier (205). Bandwidth capabilities of the transmitter (206) shall be specified by the requirements imposed by environmental conditions and the highest desired frequency content in the signal.

The device (202) also includes an independent first power source (207) that is connected to the accelerometer (204), the filter and amplifier (205) and the transmitter (206). The first independent power source (207) includes batteries. However, other sources of power adaptable to the device (202) are also within the scope of this invention.

Transmitter (206) transfers analog response signals obtained from device (202) to the display apparatus (203) through a wireless communication line (208). This analog signal is received by a remote receiver (209). The analog signal is then transferred to an A-D converter (210). The A-D converter (210) then transfers the digitized signal to a computer system (211). The computer system (211) includes a computer processing unit (211a), a memory (211b), a display screen (211c) and a user input (211d). The computer processor unit (211a) compares threshold values relating the acceleration responses to structural conditions. Based on these values, computer processor unit (211a) provides a signal to device (202) that is displayed on the on/off indicator (13b) as shown in FIG. 1(a). The digitized signals can be displayed on display screen (211c) and/or stored onto memory (211b). Computer processor unit (211a) also provides on-site data reduction and analysis through designed software that allows for visual and audible characterizations of the measured responses on display (211c). The remote receiver (209), the A-D converter (210) and the computer system (211) are connected to a second independent power source (212). The second power source (212) can operate utilizing an internal power supply such as batteries. Other sources of power adaptable to the display apparatus (203) are also within the scope of this invention. The exterior casing and housing for device (202) is as shown in FIG. (1a).

Figure 4:
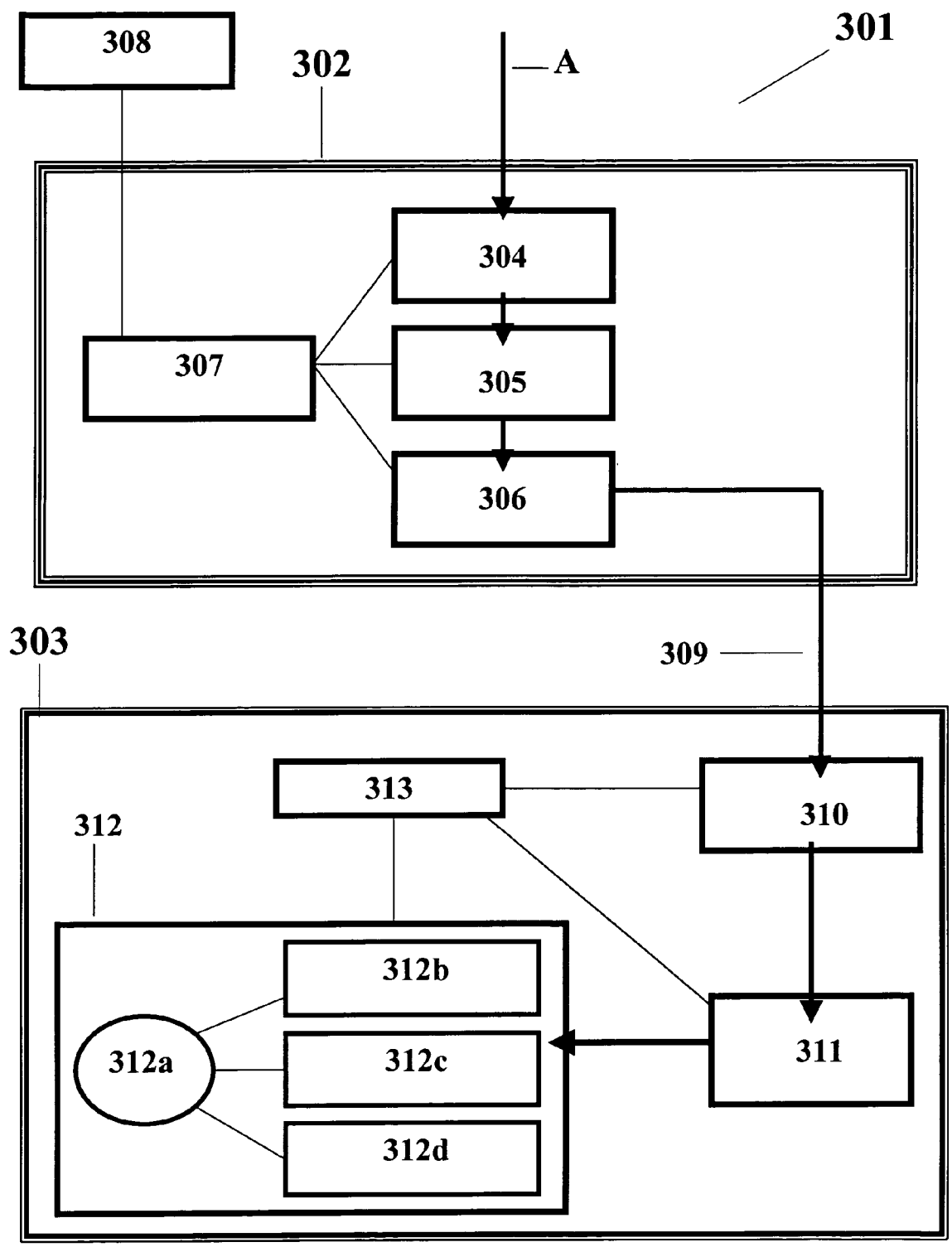
FIG. 4 shows an analog/building power/wired system of the present invention.

FIG. 4 depicts another embodiment of the present invention. FIG. 4 shows a wired analog internal power system having an alternate power source. System (301), shown in FIG. 4, provides a lightweight, portable device (302) and a display apparatus (303) that are utilized to detect and monitor collapse conditions at the time of fire or damage. The device (302) of the system (301) includes at least one accelerometer (304) as a transducer for monitoring structural responses. Accelerometer (304) must be capable of monitoring acceleration in one to three axial directions (i.e., x, y or z axis), preferably oriented perpendicular to a mounting surface, and operates in the range of 0–30 Hz. Accelerometer (304) monitors responses down to DC or zero Hz. This is because accelerometer (304) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (302) also includes a low pass filter and amplifier (305) that is connected to the accelerometer (304) for signal gains equal to 100 over a 0–30 Hz range.

Device (302) also includes at least one transmitter (306) that is connected to the filter and amplifier (305). Bandwidth capabilities of the transmitter (306) shall be specified by the requirements imposed by environmental conditions and the highest desired frequency content in the signal.

The device (302) also includes a first power source (307) that is connected to the accelerometer (304), the filter and amplifier (305) and the transmitter (306). The first power source (307) is capable of operating independently, utilizing an independent power supply such as internal batteries. Alternatively, first power source (307) may also obtain power from the building power supply (308) onto which the device (302) is attached. However, other sources of power adaptable to the device (302) are also within the scope of this invention.

Transmitter (306) transfers analog response signals obtained from device (302) to the display apparatus (303) through a wired communication line (309). The wired communication line (309) is covered with a fire retardant/heat retardant material suitable for high temperatures. This analog signal is received by a remote receiver (310). The analog signal is then transferred to an A-D converter (311). The A-D converter (311) then transfers the digitized signal to a computer system (312). The computer system (312) includes a computer processor unit (312a), a memory (312b), a display screen (312c) and a user input (312d). The computer processor unit (312a) compares threshold values relating the acceleration responses to structural conditions. Based on these values, computer processor unit (312a) provides a signal to device (302) that is displayed on the on/off indicator (13b) as shown in FIG. 1(a). The digitized signals can be displayed on display screen (312c) and/or stored onto memory (312b). Computer processor unit (312a) also provides on-site data reduction and analysis through designed software that allows for visual and audible characterizations of the measured responses on display (312c). The remote receiver (310), the A-D converter (311) and the computer system (312) are connected to a second power source (313). The second power source (313) can operate utilizing an internal power supply such as batteries. Other sources of power adaptable to the display apparatus (303) are also within the scope of this invention. The exterior casing and housing for device (302) is as shown in FIG. (1a).

Figure 5:
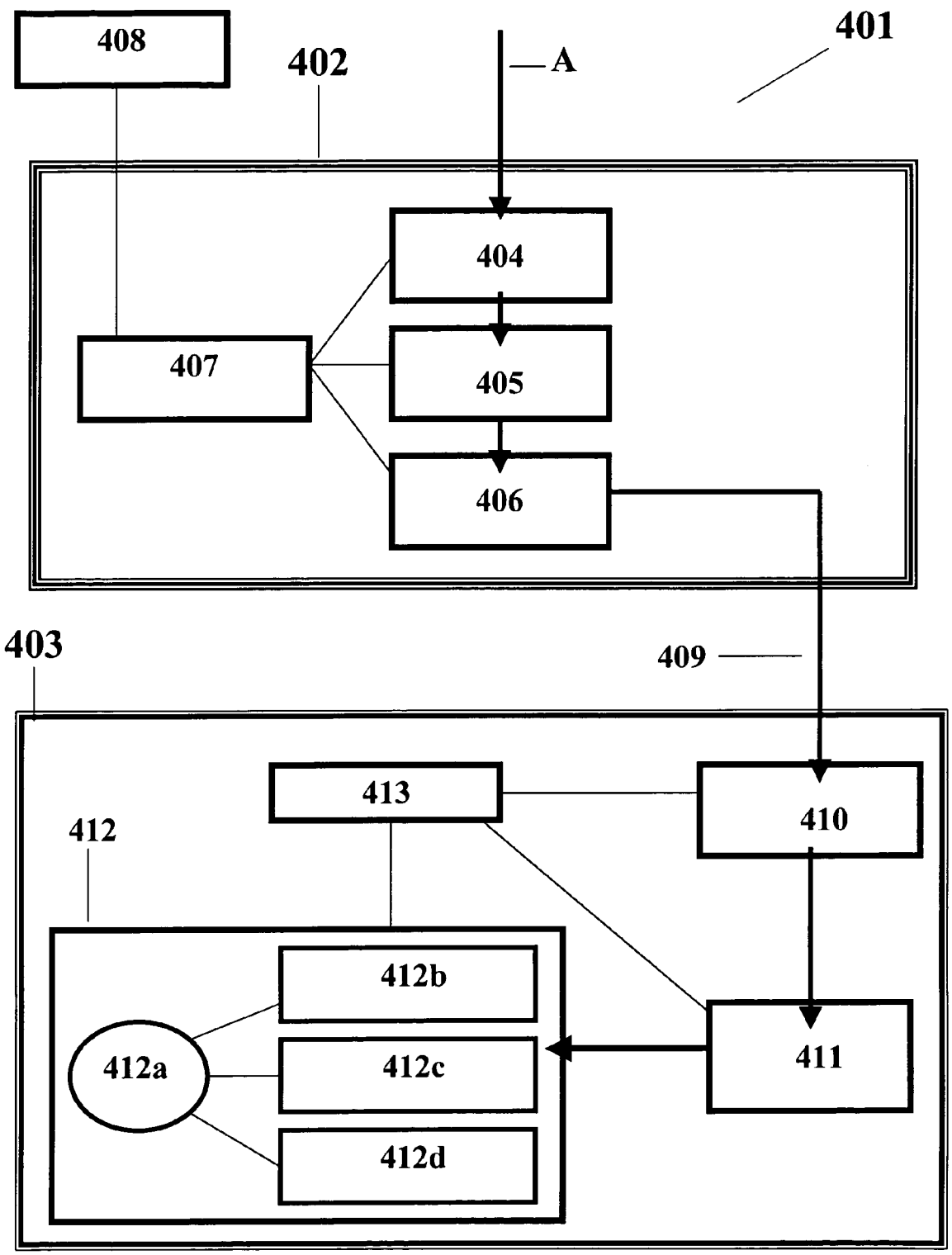
FIG. 5 shows an analog/building power/wireless system of the present invention.

FIG. 5 depicts a wireless analog internal power system having an alternate power source. System (401), shown in FIG. 5, provides a lightweight, portable device (402) and a display apparatus (403) that are utilized to detect and monitor collapse conditions at the time of fire or damage. The device (402) of the system (401) includes at least one accelerometer (404) as a transducer for monitoring structural responses. Accelerometer (404) must be capable of monitoring acceleration in one to three axial directions (i.e., x, y or z axis), preferably oriented perpendicular to a mounting surface, and operates in the range of 0–30 Hz. Accelerometer (404) monitors responses down to DC or zero Hz. This is because accelerometer (404) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (402) also includes a low pass filter and amplifier (405) that is connected to the accelerometer (404) for signal gains equal to 100 over a 0–30 Hz range.

Device (402) also includes at least one transmitter (406) that is connected to the filter and amplifier (405). Bandwidth capabilities of the transmitter (406) shall be specified by the requirements imposed by environmental conditions and the highest desired frequency content in the signal.

The device (402) also includes a first power source (407) that is connected to the accelerometer (404), the filter and amplifier (405) and the transmitter (406). The first power source (407) is capable of operating independently, utilizing an independent power supply such as internal batteries. Alternatively, first power source (407) may also obtain power from the building power supply (408) onto which the device (402) is attached. However, other sources of power adaptable to the device (402) are also within the scope of this invention.

Transmitter (406) transfers analog response signals obtained from device (402) to the display apparatus (403) through a wireless communication line (409). This analog signal is received by a remote receiver (410). The analog signal is then transferred to an A-D converter (411). The A-D converter (411) then transfers the digitized signal to a computer processor system (412). The computer system (412) includes a computer processor unit (412a), a memory (412b), a display screen (412c) and a user input (412d). The computer processor unit (412a) compares threshold values relating the acceleration responses to structural conditions. Based on these values, computer processor unit (412a) provides a signal to device (402) that is displayed on the on/off indicator (13b) as shown in FIG. 1(a). The digitized signals can be displayed on display screen (412c) and/or stored onto memory (412b). Computer processor unit (412a) also provides on-site data reduction and analysis through designed software that allows for visual and audible characterizations of the measured responses on display (412c). The remote receiver (410), the A-D converter (411) and the computer system (412) are connected to a second power source (413). The second power source (413) can operate utilizing an internal power supply such as batteries. Other sources of power adaptable to the display apparatus (403) are also within the scope of this invention. The exterior casing and housing for device (402) is as shown in FIG. (1a).

Figure 6:
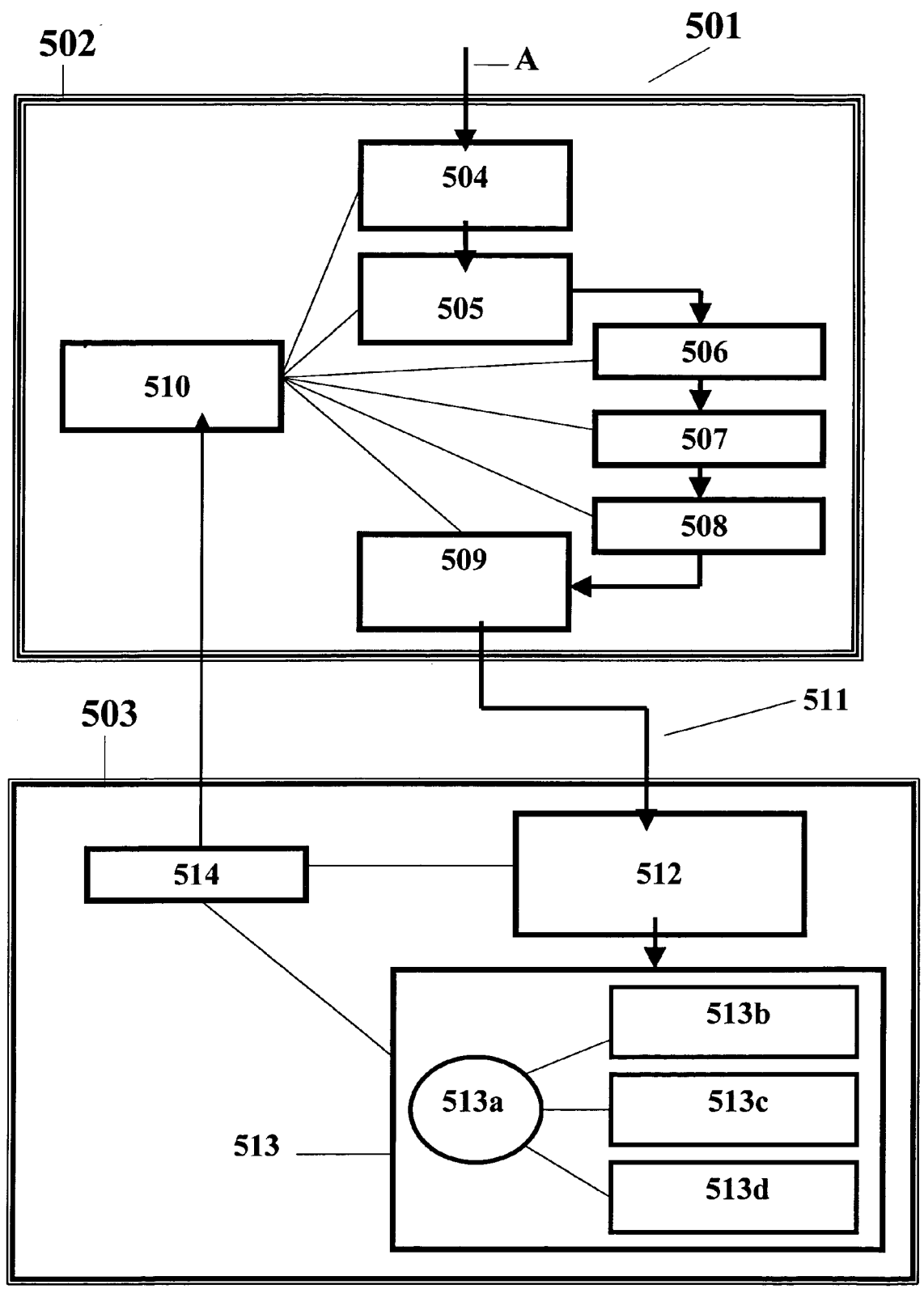
FIG. 6 shows a digital/through cable/wired system of the present invention.

FIG. 6 depicts a wired digital through cable system. System (501), shown in FIG. 6, provides a lightweight, portable device (502) and a display apparatus (503) that are utilized to detect and monitor collapse conditions at the time of fire or damage. The device (502) of the system (501) includes at least one accelerometer (504) as a transducer for monitoring structural responses. Accelerometer (504) must be capable of monitoring acceleration in one to three axial directions (i.e., x, y or z axis), preferably oriented perpendicular to a mounting surface, and operates in the range of 0–30 Hz. Accelerometer (504) monitors responses down to DC or zero Hz. This is because accelerometer (504) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (502) also includes a low pass filter and amplifier (505) that is connected to the accelerometer (504) for signal gains equal to 100 over a 0–30 Hz range. An A-D converter (506) is connected to the filter and amplifier (505) to convert the incoming analog signal into a digital one. This signal is processed in signal processor (507) and passed onto identifier (508). The identifier (508) stamps the data as specific to the device (502) of the system (501).

Device (502) also includes at least one transmitter (509) that is connected to the identifier (508). Bandwidth capabilities of the transmitter (509) shall be specified by the requirements imposed by environmental conditions and the highest desired frequency content in the signal.

The device (502) also includes a first power source (510) that is connected to the accelerometer (504), the filter and amplifier (505), the A-D converter (506), the processor (507), the identifier (508) and the transmitter (509). The first power source (510) is capable of operating independently, utilizing an independent power supply such as internal batteries. The first power source (510) may also obtain power from an alternate power supply as described herein below. Other sources of power adaptable to the device (402) are also within the scope of this invention.

Transmitter (509) transfers analog response signals obtained from device (502) to the display apparatus (503) through a wired communication line (511). The wired communication line (511) is covered with a fire retardant/heat retardant material suitable for high temperatures. This signal is received by a remote receiver (512). The remote receiver (512) transfers the digitized signal to a computer system (513). The computer system (513) includes a computer processor unit (513a), a memory (513b), a display screen (513c) and a user input (513d). The computer processor unit (513a) compares threshold values relating the acceleration responses to structural conditions. Based on these values, computer processor unit (513a) provides a signal to device (502) that is displayed on the on/off indicator (13b) as shown in FIG. 1(a). The digitized signals can be displayed on display screen (513c) and/or stored onto memory (513b). Computer processor unit (513a) also provides on-site data reduction and analysis through designed software that allows for visual and audible characterizations of the measured responses on display (513c). The remote receiver (512) and the computer system (513) are connected to a second power source (514). The second power source (514) is also capable of providing power to the first power source (510) of the device (502). The second power source (514) can operate utilizing an internal power supply such as batteries. Other sources of power adaptable to the display apparatus (503) are also within the scope of this invention. The exterior casing and housing for device (502) is as shown in FIG. (1a).

Figure 7:
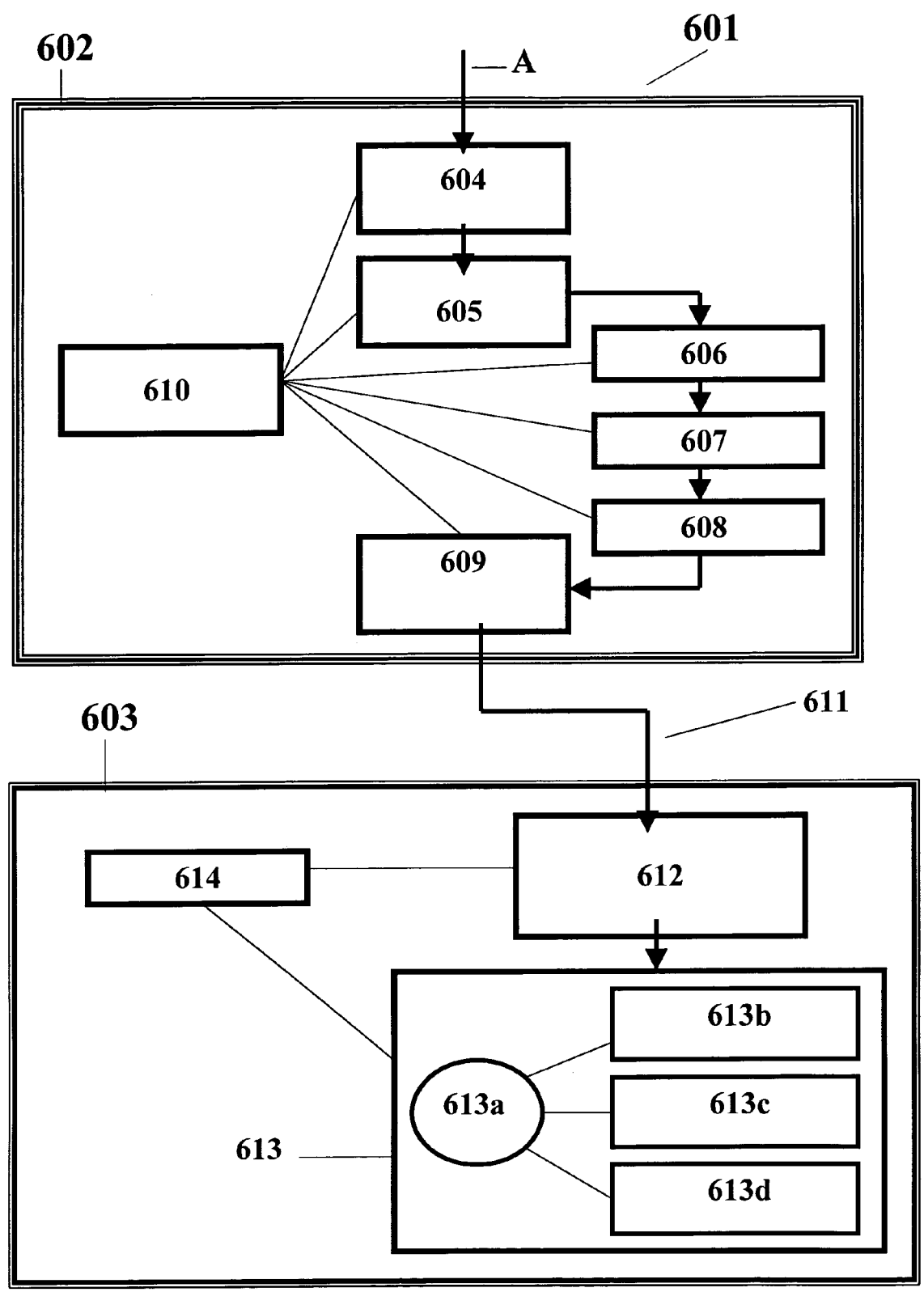
FIG. 7 shows a digital/internal power/wired system of the present invention.

FIG. 7 shows another embodiment of a wired digital through cable system. The system (601), shown in FIG. 7, provides a lightweight, portable device (602) and a display apparatus (603) that are utilized to detect and monitor collapse conditions at the time of fire or damage. The device (602) of the system (601) includes at least one accelerometer (604) as a transducer for monitoring structural responses.

Accelerometer (604) must be capable of monitoring acceleration in one to three axial directions (i.e., x, y or z axis), preferably oriented perpendicular to a mounting surface, and operates in the range of 0–30 Hz. Accelerometer (604) monitors responses down to DC or zero Hz. This is because accelerometer (604) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (602) also includes a low pass filter and amplifier (605) that is connected to the accelerometer (604) for signal gains equal to 100 over a 0–30 Hz range. An A-D converter (606) is connected to the filter and amplifier (605) to convert the incoming analog signal into a digital one. This signal is processed in signal processor (607) and passed onto identifier (608).

Device (602) also includes at least one transmitter (609) that is connected to the identifier (608). Bandwidth capabilities of the transmitter (609) shall be specified by the requirements imposed by environmental conditions and the highest desired frequency content in the signal.

The device (602) also includes a first power source (610) that is connected to the accelerometer (604), the filter and amplifier (605), the A-D converter (606), the processor (607), the identifier (608) and the transmitter (609). The first power source (610) is capable of operating independently, utilizing an independent power supply such as internal batteries. Other sources of power adaptable to the device (402) are also within the scope of this invention.

Transmitter (609) transfers analog response signals obtained from device (602) to the display apparatus (603) through a wired communication line (611). The wired communication line (611) is covered with a fire retardant/heat retardant material suitable for high temperatures. This signal is received by a remote receiver (612). The remote receiver (612) transfers the digitized signal to a computer processor unit (613). The computer system (613) includes a computer processor unit (613a), a memory (613b), a display screen (613c) and a user input (613d). The computer processor unit (613a) compares threshold values relating the acceleration responses to structural conditions. Based on these values, computer processor unit (613a) provides a signal to device (602) that is displayed on the on/off indicator (13b) as shown in FIG. 1(a). The digitized signals can be displayed on display screen (613c) and/or stored onto memory (613b). Computer processor unit (613a) also provides on-site data reduction and analysis through designed software that allows for visual and audible characterizations of the measured responses on display (613c). The remote receiver (612) and the computer system (613) are connected to a second power source (614). The second power source (614) can operate utilizing an internal power supply such as batteries. Other sources of power adaptable to the display apparatus (603) are also within the scope of this invention. The exterior casing and housing for device (602) is as shown in FIG. 1(a).

Figure 8:
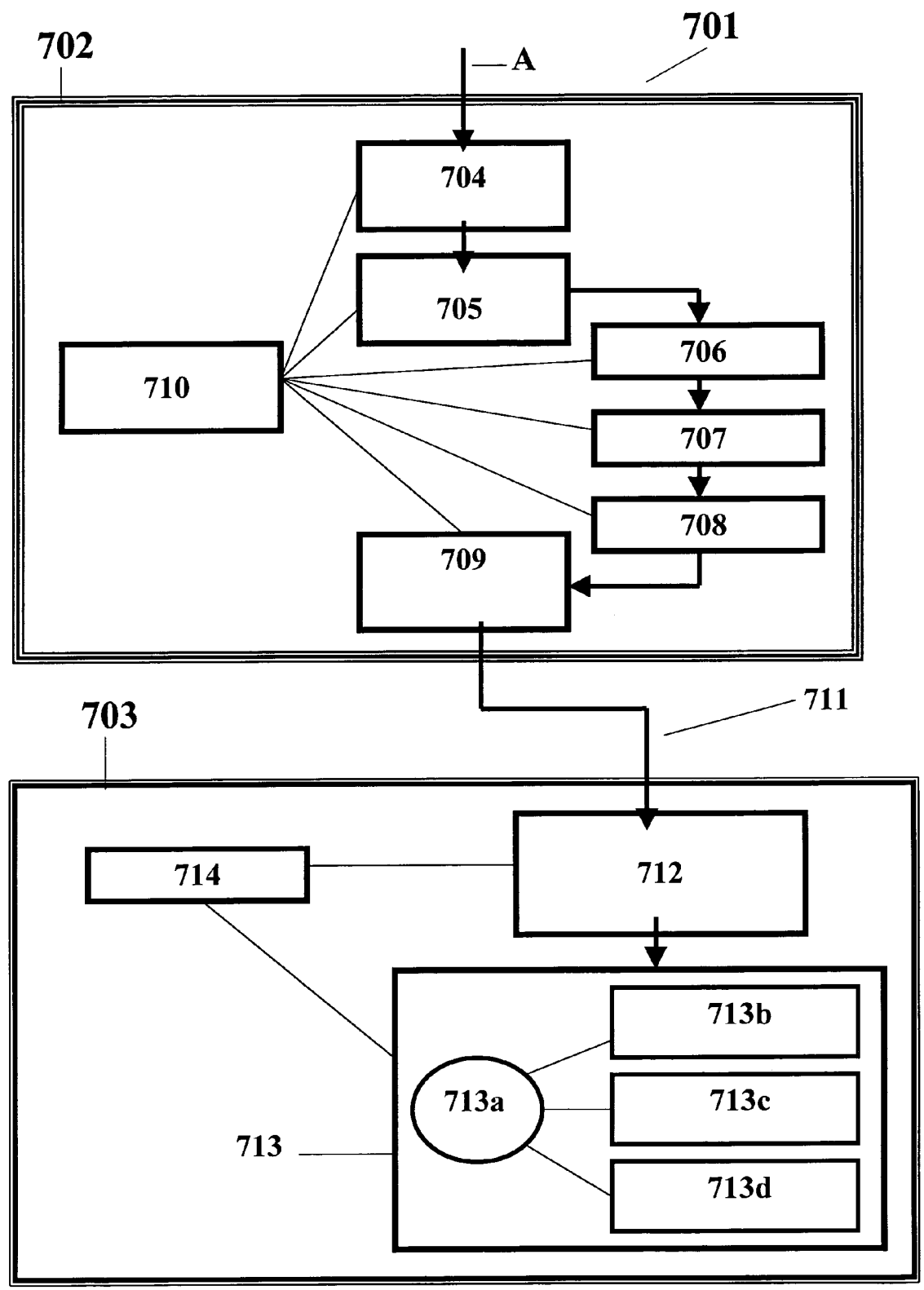
FIG. 8 shows a digital/internal power/wireless system of the present invention.

FIG. 8 shows another embodiment of a wired digital through cable system. The system (701), shown in FIG. 8, provides a lightweight, portable device (702) and a display apparatus (703) that are utilized to detect and monitor collapse conditions at the time of fire or damage. The device (702) of the system (701) includes at least one accelerometer (704) as a transducer for monitoring structural responses. Accelerometer (704) must be capable of monitoring acceleration in one to three axial directions (i.e., x, y or z axis), preferably oriented perpendicular to a mounting surface, and operates in the range of 0–30 Hz. Accelerometer (704) monitors responses down to DC or zero Hz. This is because accelerometer (704) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (702) also includes a low pass filter and amplifier (705) that is connected to the accelerometer (704) for signal gains equal to 100 over a 0–30 Hz range. An A-D converter (706) is connected to the filter and amplifier (705) to convert the incoming analog signal into a digital one. This signal is processed in signal processor (707) and passed onto identifier (708).

Device (702) also includes at least one transmitter (709) that is connected to the identifier (708). Bandwidth capabilities of the transmitter (709) shall be specified by the requirements imposed by environmental conditions and the highest desired frequency content in the signal.

The device (702) also includes a first power source (710) that is connected to the accelerometer (704), the filter and amplifier (705), the A-D converter (706), the processor (707), the identifier (708) and the transmitter (709). The first power source (710) is capable of operating independently, utilizing an independent power supply such as internal batteries. Other sources of power adaptable to the device (702) are also within the scope of this invention.

Transmitter (709) transfers analog response signals obtained from device (702) to the display apparatus (703) through a wireless communication line (711). This signal is received by a remote receiver (712). The remote receiver (712) transfers the digitized signal to a computer processor unit (713). The computer system (713) includes a computer processor unit (713a), a memory (713b), a display screen (713c) and a user input (713d). The computer processor unit (713a) compares threshold values relating the acceleration responses to structural conditions. Based on these values, computer processor unit (713a) provides a signal to device (702) that is displayed on the on/off indicator (13b) as shown in FIG. 1(a). The digitized signals can be displayed on display screen (713c) and/or stored onto memory (713b). Computer processor unit (713a) also provides on-site data reduction and analysis through designed software that allows for visual and audible characterizations of the measured responses on display (713c). The remote receiver (712) and the computer system (713) are connected to a second power source (714). The second power source (714) can operate utilizing an internal power supply such as batteries. Other sources of power adaptable to the display apparatus (703) are also within the scope of this invention. The exterior casing and housing for device (702) is as shown in FIG. (1a).

Figure 9:
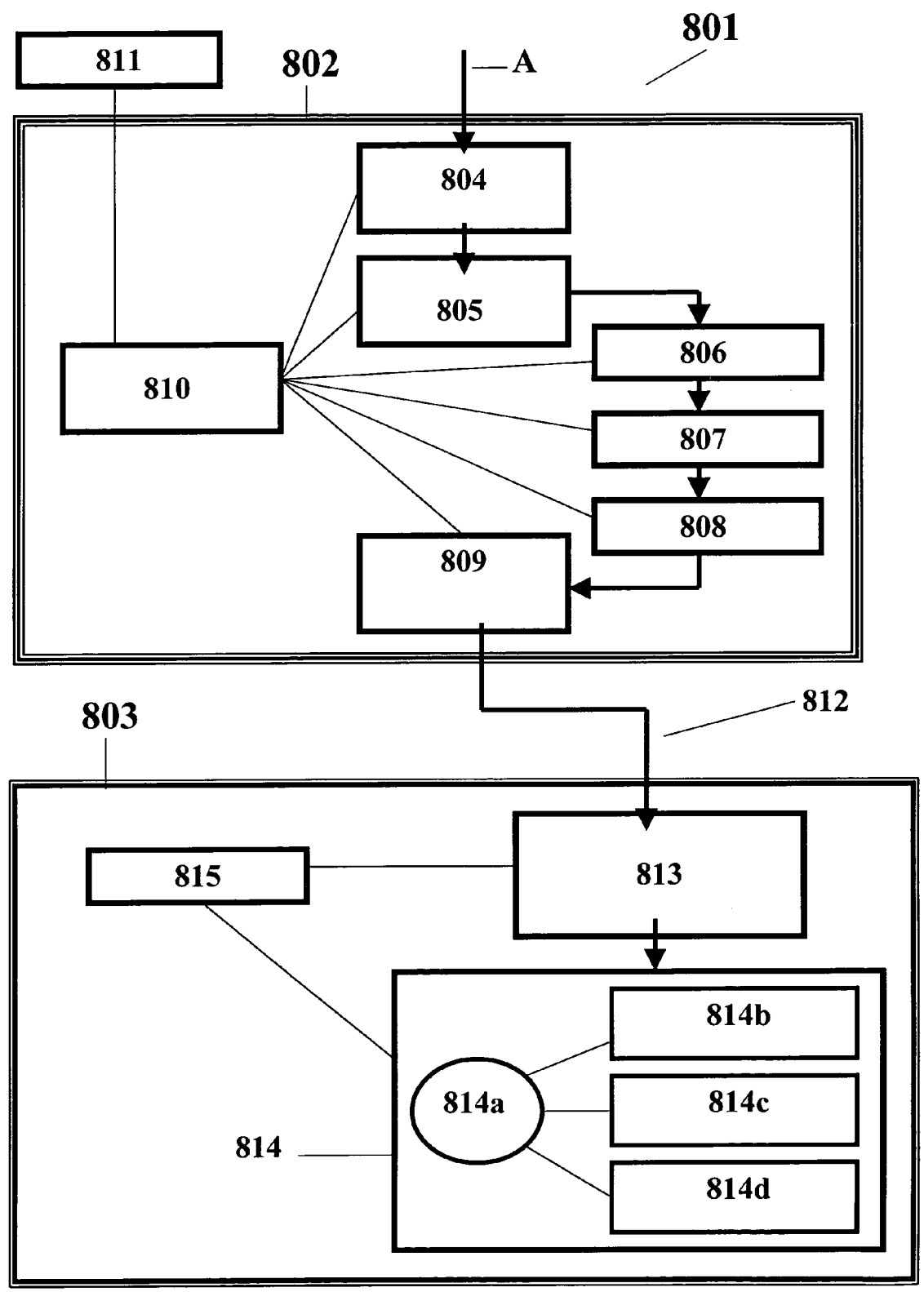
FIG. 9 shows a digital/building power/wired system of the present invention.

FIG. 9 shows another embodiment of a wired digital through cable system. The system (801), shown in FIG. 9, provides a lightweight, portable device (802) and a display apparatus (803) that are utilized to detect and monitor collapse conditions at the time of fire or damage. The device (802) of the system (801) includes at least one accelerometer (804) as a transducer for monitoring structural responses. Accelerometer (804) must be capable of monitoring acceleration in one to three axial directions (i.e., x, y or z axis), preferably oriented perpendicular to a mounting surface, and operates in the range of 0–30 Hz. Accelerometer (804) monitors responses down to DC or zero Hz. This is because accelerometer (804) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (802) also includes a low pass filter and amplifier (805) that is connected to the accelerometer (804) for signal gains equal to 100 over a 0–30 Hz range. An A-D converter (806) is connected to the filter and amplifier (805) to convert the incoming analog signal into a digital one. This signal is processed in signal processor (807) and passed onto identifier (808).

Device (802) also includes at least one transmitter (809) that is connected to the identifier (808). Bandwidth capabilities of the transmitter (809) shall be specified by the requirements imposed by environmental conditions and the highest desired frequency content in the signal.

The device (802) also includes a first power source (810) that is connected to the accelerometer (804), the filter and amplifier (805), the A-D converter (806), the processor (807), the identifier (808) and the transmitter (809). The first power source (810) is capable of operating independently, utilizing an independent power supply such as internal batteries. Alternatively, the first power source (810) can also utilize power obtained from a building power supply (811) onto which the device (802) is attached. Other sources of power adaptable to the device (802) are also within the scope of this invention.

Transmitter (809) transfers analog response signals obtained from device (802) to the display apparatus (803) through a wired communication line (812). The wired communication line (812) is covered with a fire retardant/heat retardant material suitable for high temperatures. This signal is received by a remote receiver (813). The remote receiver (813) transfers the digitized signal to a computer system (814). The computer system (814) includes a computer processor unit (814*a*), a memory (814*b*), a display screen (814*c*) and a user input (814*d*). The computer processor unit (814*a*) compares threshold values relating the acceleration responses to structural conditions. Based on these values, computer processor unit (814*a*) provides a signal to device (802) that is displayed on the on/off indicator (13*b*) as shown in FIG. 1(*a*). The digitized signals can be displayed on display screen (814*c*) and/or stored onto memory (814*b*). Computer processor unit (814*a*) also provides on-site data reduction and analysis through designed software that allows for visual and audible characterizations of the measured responses on display (814*c*). The remote receiver (813) and the computer system (814) are connected to a second power source (815). The second power source (815) can operate utilizing an internal power supply such as batteries. Other sources of power adaptable to the display apparatus (803) are also within the scope of this invention. The exterior casing and housing for device (802) is as shown in FIG. (1*a*).

Figure 10:
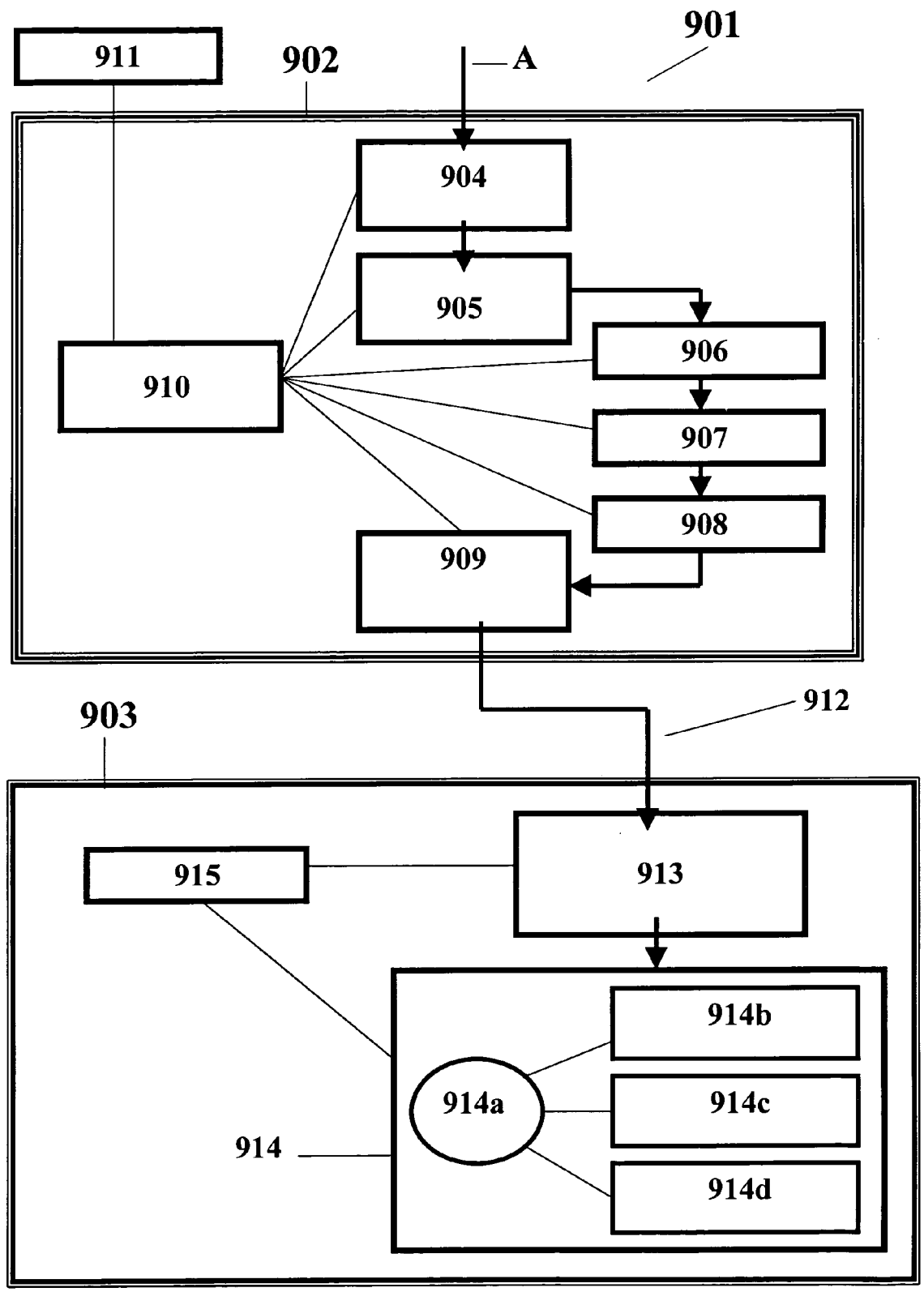
FIG. 10 shows a digital/building power/wireless system of the present invention.

FIG. 10 shows another embodiment of a wired digital through cable system. The system (901), shown in FIG. 10, provides a lightweight, portable device (902) and a display apparatus (903) that are utilized to detect and monitor collapse conditions at the time of fire or damage. The device (902) of the system (901) includes at least one accelerometer (904) as a transducer for monitoring structural responses. Accelerometer (904) must be capable of monitoring acceleration in one to three axial directions (i.e., x, y or z axis), preferably oriented perpendicular to a mounting surface, and operates in the range of 0–30 Hz. Accelerometer (904) monitors responses down to DC or zero Hz. This is because accelerometer (904) tracks very low frequency responses corresponding to the changing mean accelerations in the structures. Accelerometers that are not capable of monitoring DC responses will filter or attenuate these responses around 4 Hz, and, therefore, be incapable of detecting changing mean accelerations approaching ultimate collapse. The device (902) also includes a low pass filter and amplifier (905) that is connected to the accelerometer (904) for signal gains equal to 100 over a 0–30 Hz range. An A-D converter (906) is connected to the filter and amplifier (905) to convert the incoming analog signal into a digital one. This signal is processed in signal processor (907) and passed onto identifier (908).

Device (902) also includes at least one transmitter (909) that is connected to the identifier (908). Bandwidth capabilities of the transmitter (909) shall be specified by the requirements imposed by environmental conditions and the highest desired frequency content in the signal.

The device (902) also includes a first power source (910) that is connected to the accelerometer (904), the filter and amplifier (905), the A-D converter (906), the processor (907), the identifier (908) and the transmitter (909). The first power source (910) is capable of operating independently, utilizing an independent power supply such as internal batteries. Alternatively, the first power source (910) can also utilize power obtained from a building power supply (911) onto which the device (902) is attached. Other sources of power adaptable to the device (902) are also within the scope of this invention.

Transmitter (909) transfers analog response signals obtained from device (902) to the display apparatus (903) through a wireless communication line (912). This signal is received by a remote receiver (913). The remote receiver (913) transfers the digitized signal to a computer system (914). The computer system (914) includes a computer processor unit (914*a*), a memory (914*b*), a display screen (914*c*) and a user input (914*d*). The computer processor unit (914*a*) compares threshold values relating the acceleration responses to structural conditions. Based on these values, computer processor unit (914*a*) provides a signal to device (902) that is displayed on the on/off indicator (13*b*) as shown in FIG. 1(*a*). The digitized signals can be displayed on display screen (914*c*) and/or stored onto memory (914*a*). Computer processor unit (914*a*) also provides on-site data reduction and analysis through designed software that allows for visual and audible characterizations of the measured responses on display (914*c*). The remote receiver (913) and the computer system (914) are connected to a second power source (915). The second power source (915) can operate utilizing an internal power supply such as batteries. Other sources of power adaptable to the display apparatus (903) are also within the scope of this invention. The exterior casing and housing for device (902) is as shown in FIG. (1*a*).

The systems of FIGS. 1 through 10 can be attached to the exterior of a structure (not shown) that is under burn or damage conditions and mounted to an exterior surface of the structure, using bolts or adhesives. The optimal mounting location is dependent upon the structure and accessibility by rescue workers. Placing device (2), (102), (202), (302), (402), (502), (602), (702), (802) or (902) at a truss support height or at a mid span height (the ceiling height midway between the supports) is sufficient. Generally speaking, this placement is at a location of 8 ft from the ground. Placement on a top portion of a beam or truss is generally impractical, and also detrimental to the device (2), (102), (202), (302), (402), (502), (602), (702), (802) or (902) as it exerts added thermal stress. It is also mounted in a manner such that it is used to monitor acceleration responses perpendicular to the surface that it is mounted. And in a manner that does not penetrate the wall through to the drywall and framing.

Once mounted, accelerometer (4), (104), (204), (304), (404), (504), (604), (704), (804), or (904) begins to monitor acceleration responses (A) emitting from the structure at time of burn, and continues to monitor acceleration responses through actual collapse to post collapse.

Multiple devices of (2), (102), (202), (302), (402), (502), (602), (702), (802) or (902) can be mounted in this fashion, so that a plurality of surfaces can be monitored. Alternatively, a single device (2), (102), (202), (302), (402), (502), (602), (702), (802) or (902) having multiple accelerometers (4), (104), (204), (304), (404), (504), (604), (704), (804), or (904) capable of monitoring and detecting acceleration responses in all directions (x-y-z axis) may be used. In yet another embodiment, a single device (2), (102), (202), (302), (402), (502), (602), (702), (802) or (902) having a single accelerometer (4), (104), (204), (304), (404), (504), (604), (704), (804), or (904) that monitors all three axes is also within the scope of the present invention.

The method and system discussed above, is not limited to detection at the time of collapse. Rather, the systems as shown in FIGS. 1 through 10 of the present invention can be installed at time of structure construction. When the system of the present invention is pre-mounted, data acquisition captures the ignition event and continues past the time of structure collapse. As a result, the data represent a complete sequence of events beginning prior to ignition, through ignition, structural response during burn, and actual collapse t-o post collapse response. As stated above, data acquisition is event based, where a structure's current condition and state is assessed, recorded and used for real time structural evaluation. Evaluations are performed on the basis of the system's ability to detect low level structural vibrations and to convert these vibrations into transient amplitude and decay rate characteristics.

Test Data:

A series of burn tests were conducted to determine collapse mechanism and to test the system and device of the present invention. As shown through the test results identified in FIGS. 11 through 14 below, the system and method of the present invention detect vibration responses on the exterior of a structure so as to determine transient amplitude and decay characteristics. The system detects low-level vibrations that are converted into dominant transient signals indicating amplitude fluctuations as well as decay rates associated with system stability. Structural stability is characterized in terms of response amplitudes that decay sufficiently within fixed time intervals. Structural instability is characterized in terms of growing response amplitudes that do not decay within the fixed time intervals.

Figure 11:
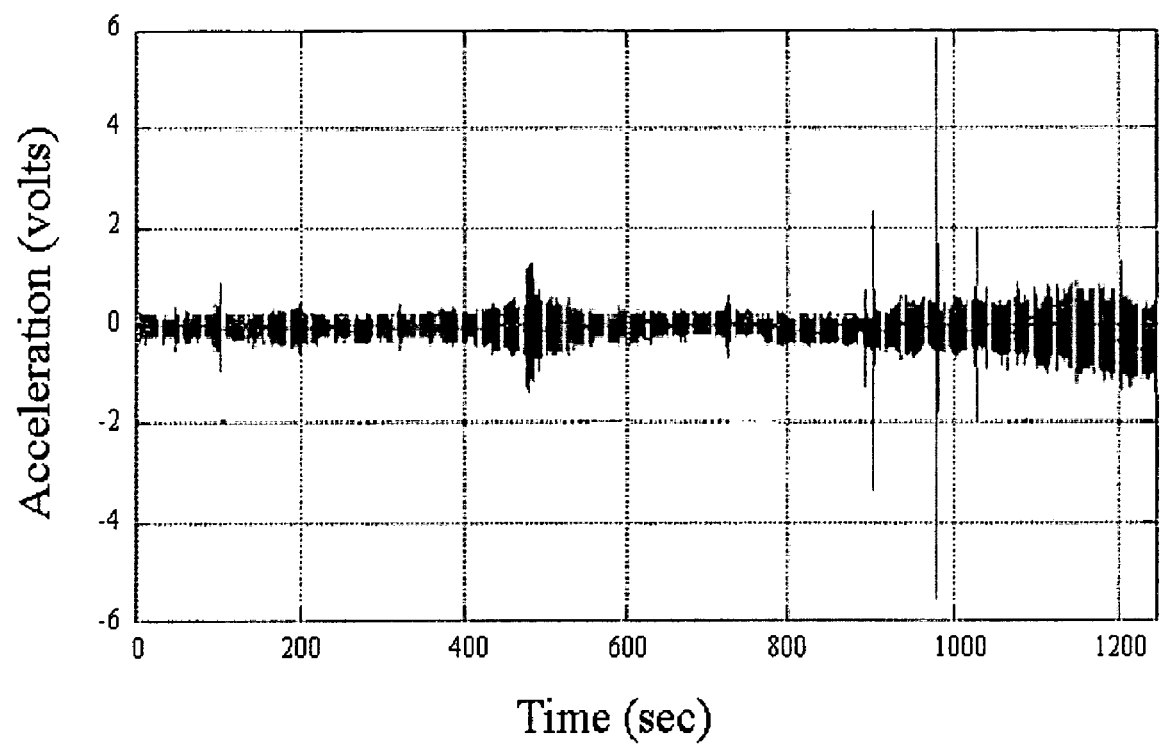
FIG. 11 is a graph showing the acceleration signal over time, obtained from the Phoenix, Ariz., burn test.

The Phoenix, Ariz. Test:

A test burn of a truss support was conducted in Phoenix, Ariz. FIG. 11 shows a graph of the acceleration responses over real-time, during the burn. Phase 1 of the test was the pre-ignition event (occurring between 0–200 seconds). Phase 2 shows structural vibrations due to the fire (occurring between 200 and 400 seconds). Phase 3 is a transient response (occurring at approximately 500 seconds). Phase 4 shows structural vibrations due to the continued burn (occurring at approximately 700 seconds. Phase 5 shows the increasing structural response due to the fire compromising the structural integrity of the building.

Figure 12A:
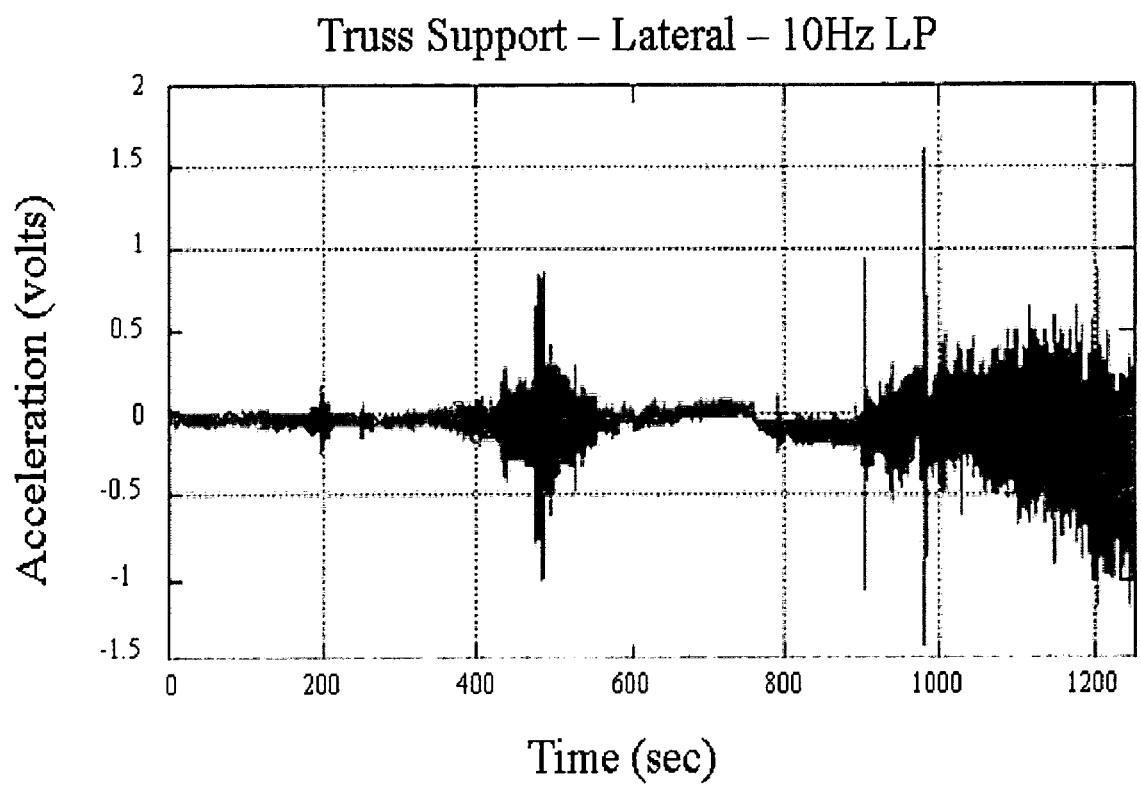
FIG. 12(a) is a graph showing the acceleration response corresponding to the acceleration signal from the Phoenix, Ariz., burn test.

FIG. 12(a) shows the acceleration response over time and corresponding to the graph shown in FIG. 11 and discussed above. The data points shown in FIG. 12(a) were taken from different locations of the burning structure utilizing a second device. FIG. 12(a) shows transient characteristics that indicate structural stability. The structure exhibits a strong transient behavior that grows in amplitude, but that decays to pre-transient levels. Later in the time history, multiple transients are observed with growing amplitude and decay rates that do not allow a return to pre-transient levels. Collapse is indicated near the end of the record and coincides with the large transient near 1200 seconds.

Figure 12B:
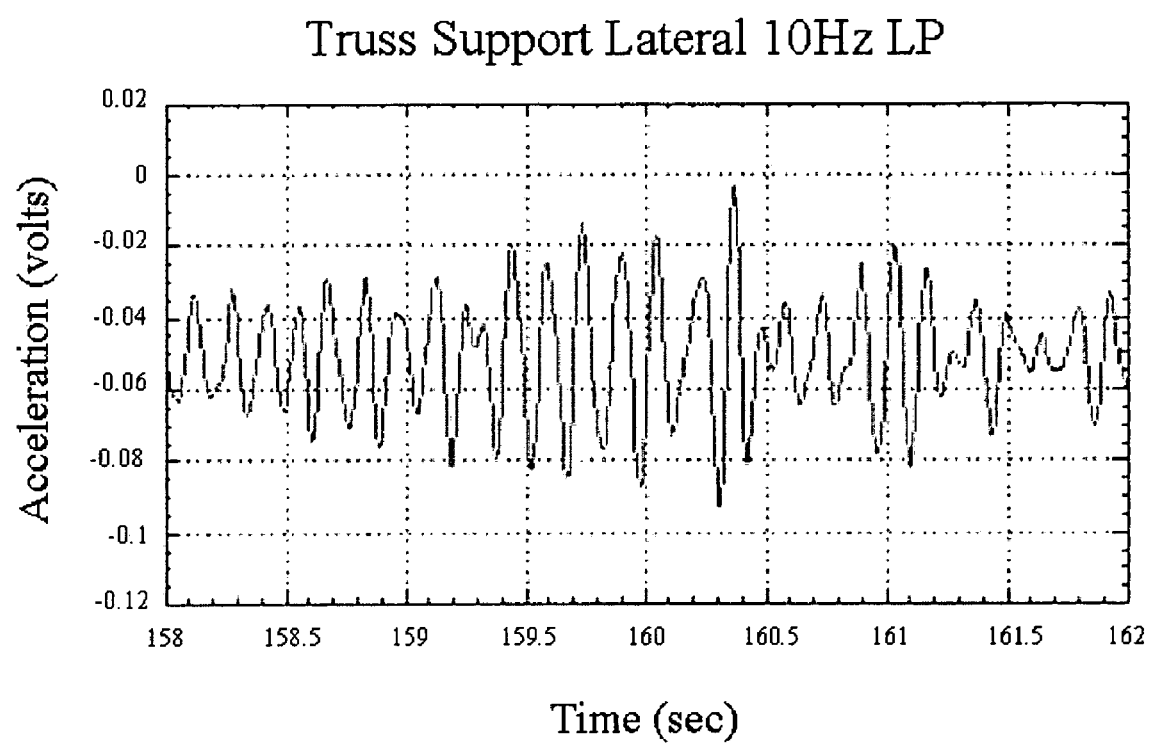
FIG. 12(b) is a filtered signal of the acceleration response over time, obtained from the Phoenix, Ariz., burn test.

FIG. 12(b) shows a graph of the data of FIG. 12(a) subsequent to filtering. The data obtained from the burn was filtered using a low pass filter to view a clean signal of the structural resonance, without ambient noise. FIG. 12(b) is an expanded view of a discrete time step within FIG. 12(a). This view shows the sinusoidal motions occurring within the structure. The signal obtained shows the system of the present invention's ability to track transient conditions associated with structural stability. The signal is taken early during the burn test on the Phoenix, Ariz., structure and highlights the system's ability to sense growing transient amplitudes and the subsequent decay beyond 160.5 seconds. The ability of the system to provide this information allows a methodology based on tracking transient characteristics indicative of structural stability.

Figure 12C:
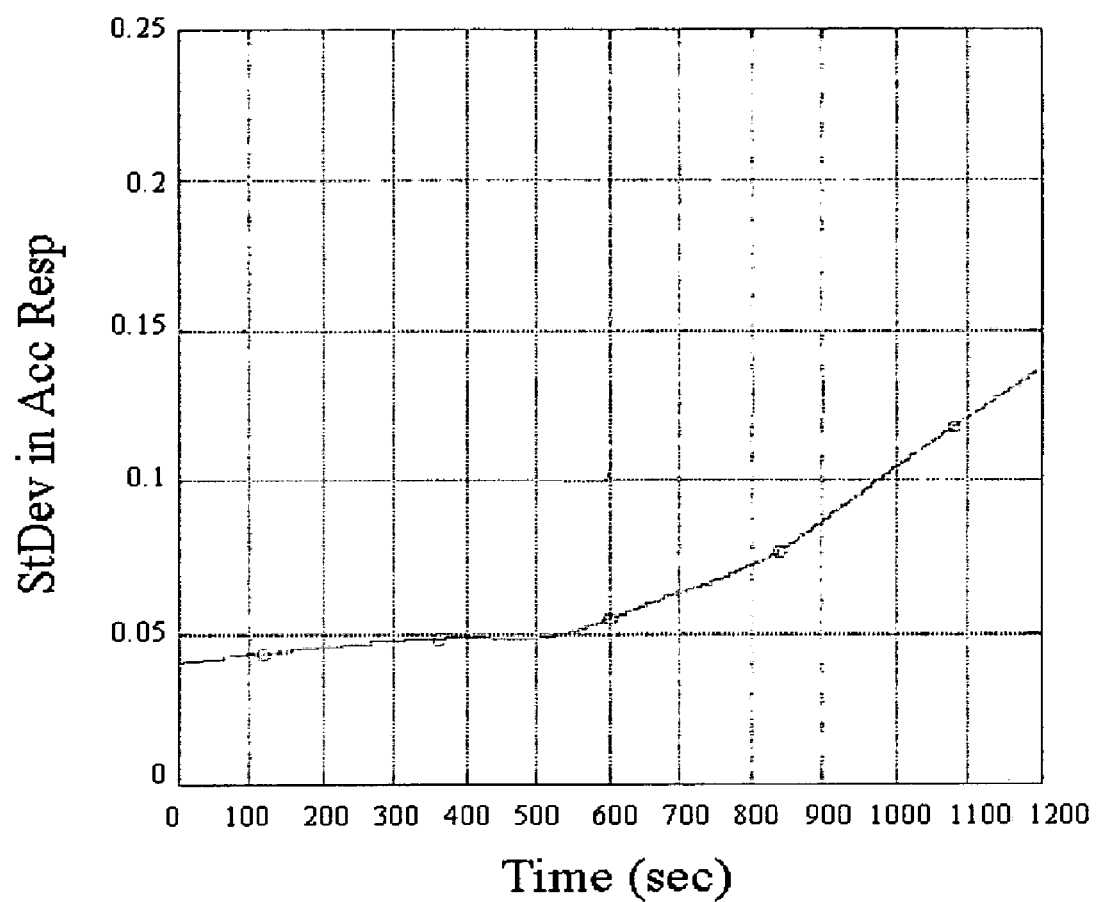
FIG. 12(c) is a graph indicating the breakaway point corresponding to weakened structural support, obtained from the Phoenix, Ariz., burn test.

FIG. 12(c) shows a curve indicating a distinctive breakaway point that correlates to damage conditions, specifically, weakened structural support due to fire. The increasing trend beyond 600 seconds is irreversible. Since this point can be determined, this test provides proof that large increases or changes in acceleration, when detected early enough, as per the system and method of the present invention, will provide warning of impending collapse.

The Kingston, N.C. test:

Five single story wood frame houses were burned through roof collapse. These structures were built according to post 1970 construction codes in the Kingston, N.C. area. These structures were restored in the aftermath of hurricanes in the region and were available to local fire fighting agencies for training exercises involving structural fires.

Three of the five houses were monitored for structural collapse. Due to the lightweight construction of these houses, the primary effect of the fire was to "eat away" at the roof and no real collapse mechanism was detected. Subsequently, a 250 gal capacity oil storage tank was placed on top of the roof of the last house. The storage tank was filled with water to provide an approximate load of 1200 lbs. and strapped onto the roof to ensure a collapse scenario.

Four devices as per the present invention were installed around the perimeter of the house. At each location, the device of the system was mounted at an 8 ft height onto the exterior brick surface. The device was mounted using bolts, and care was taken not to penetrate the wall through to the drywall and wood stud framing. The devices were oriented so that motion perpendicular to the wall could be monitored. The building was then set on fire.

Data acquisition began prior to ignition and continued past the time of roof collapse. As a result, the data represents a complete sequence of events prior to ignition, ignition, structural response during burn, actual roof collapse and post collapse response. Digital images and video images were also taken to establish a time sequence. The occurrence of the collapse is substantiated by the video time sequence.

Figure 13:
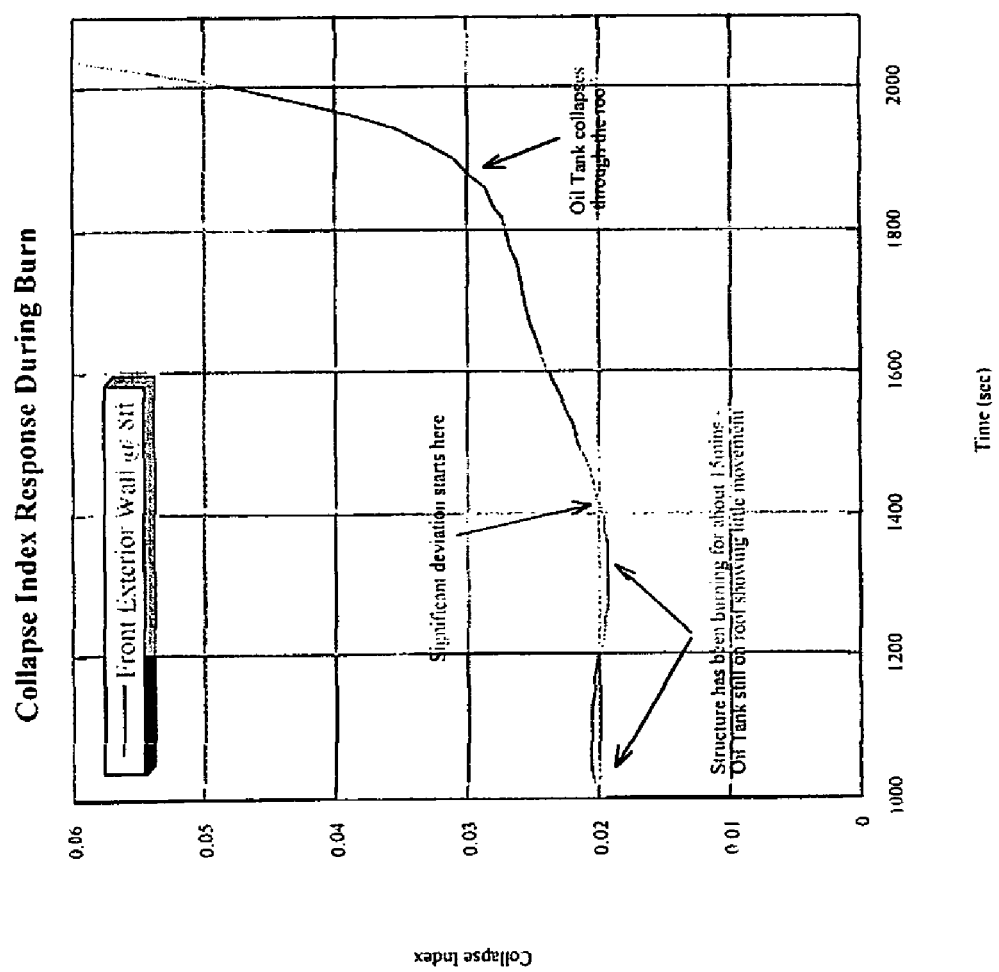
FIG. 13 shows the collapse index corresponding to the measured acceleration responses over time obtained from the Kingston, N.C., burn test.

All four of the devices survived the burn and the data presented in FIG. 13 was taken from one of the devices. FIG. 13 shows transient amplitude based collapse index for a single family home. Baseline information is the basis for comparisons below 1400 seconds over which no significant variation in structural stability is observed. Beyond 1400 seconds, rapid changes in transient amplitudes and the growing decay rates result in large variations from baseline leading to ultimate collapse. The response shown is a snap shot of changing transient characteristics leading to global structural collapse during the burn test on a single family home.

Figure 14:
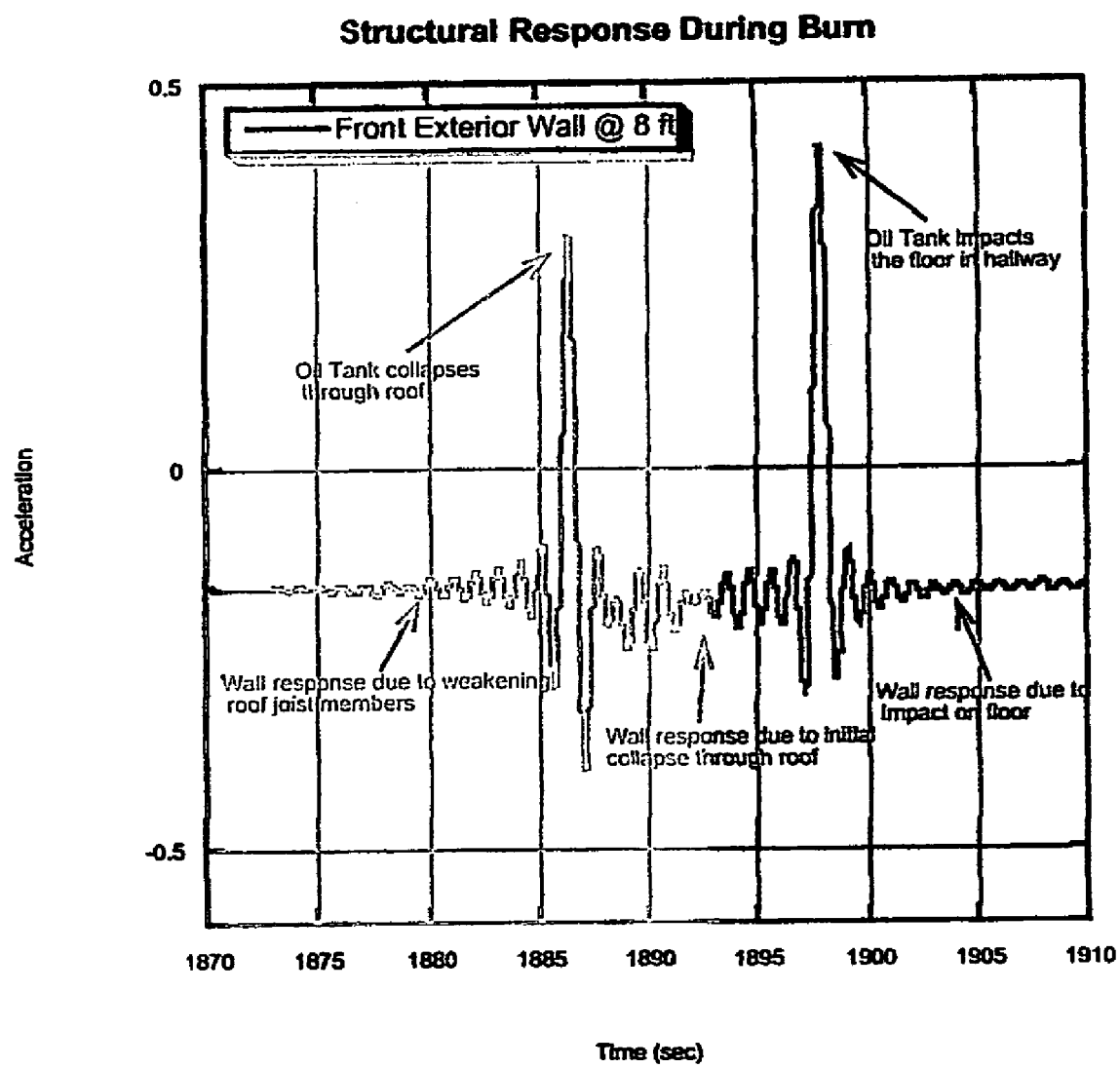
FIG. 14 is a graph showing measured acceleration response from test data obtained from the Kingston, N.C., burn test.

FIG. 14 is a graph showing measured acceleration response time at the time of roof collapse. Wall response due to weakening roof joist members begins prior to 1880 seconds. The first peak occurs at approximately 1886 seconds, followed by increased dynamic sinusoidal response. Another peak occurs around 1898 seconds followed by another set of dynamic sinusoidal responses (around 1900 seconds). The first peak corresponds to the oil tank collapsing through the roof, while the second spike corresponds to impact of the tank on the hallway floor. The first set of sinusoidal responses are associated with the movement monitored on the exterior wall in the seconds leading up to collapse due to weakening roof joists, followed by the wall response as the tank is falling through the roof. The second set of sinusoidal responses is due to the tank impact on the hallway floor.

As discussed above, the system and method of the present invention detects vibration responses on the exterior of a structure to determine transient amplitude and decay characteristics indicative of collapse. The system detects low-level vibrations that are converted into dominant transient signals that indicate amplitude fluctuations as well as decay rates associated with system stability. Structural stability is characterized by response amplitudes that decay sufficiently within fixed time intervals. Structural instability is characterized by growing response amplitudes that do not decay within the fixed time intervals. The data obtained from the vibration responses highlights the system's ability to sense growing transient amplitudes, the possibility of subsequent decay and the actual decay indicative of collapse. The ability of the system to provide this information allows a methodology based on tracking transient characteristics indicative of structural stability.

The wired and wireless configurations discussed above are configured to operate with methodologies that process raw data, appearing as a combination of sinusoidal and random signals obtained through the building sensor system (1), (101), (201), (301), (401), (501), (601), (701), (801) or (901) shown and discussed above, over a period of time. These signal waveforms are obtained using the devices discussed in FIGS. 1 through 10 above and a novel analysis method discussed below.

It is important to note that the present invention incorporates a plurality of steps that may be performed by hardware components or may be embodied in machine-executable instructions, that in turn may be used to cause a processor to logic circuits programmed with the relevant instructions to execute the plurality of steps. Alternatively, the steps may be performed by a combination of hardware and software, as is understood by one of ordinary skill in the art.

The present invention may be provided as a computer program product that may include a machine readable medium having the necessary storage capacity to have stored therein instructions used to program devices such as computers or the like to perform a process according to the present invention. This machine readable medium includes but is not limited to Zip-drives, optical disks, floppy and hard disks, CD-ROMs, ROM, RAM, EPROM, EEPROMS, flash memory, and other mediums as is understood by one of ordinary skill in the art.

Additionally, the present invention may also be downloaded as a computer program product, wherein the program may be transferable between computers or other processing instruments via communication links and computer readable signals, as is understood by one of ordinary skill in the art.

The Health of Burning Structures Process

Figure 15:
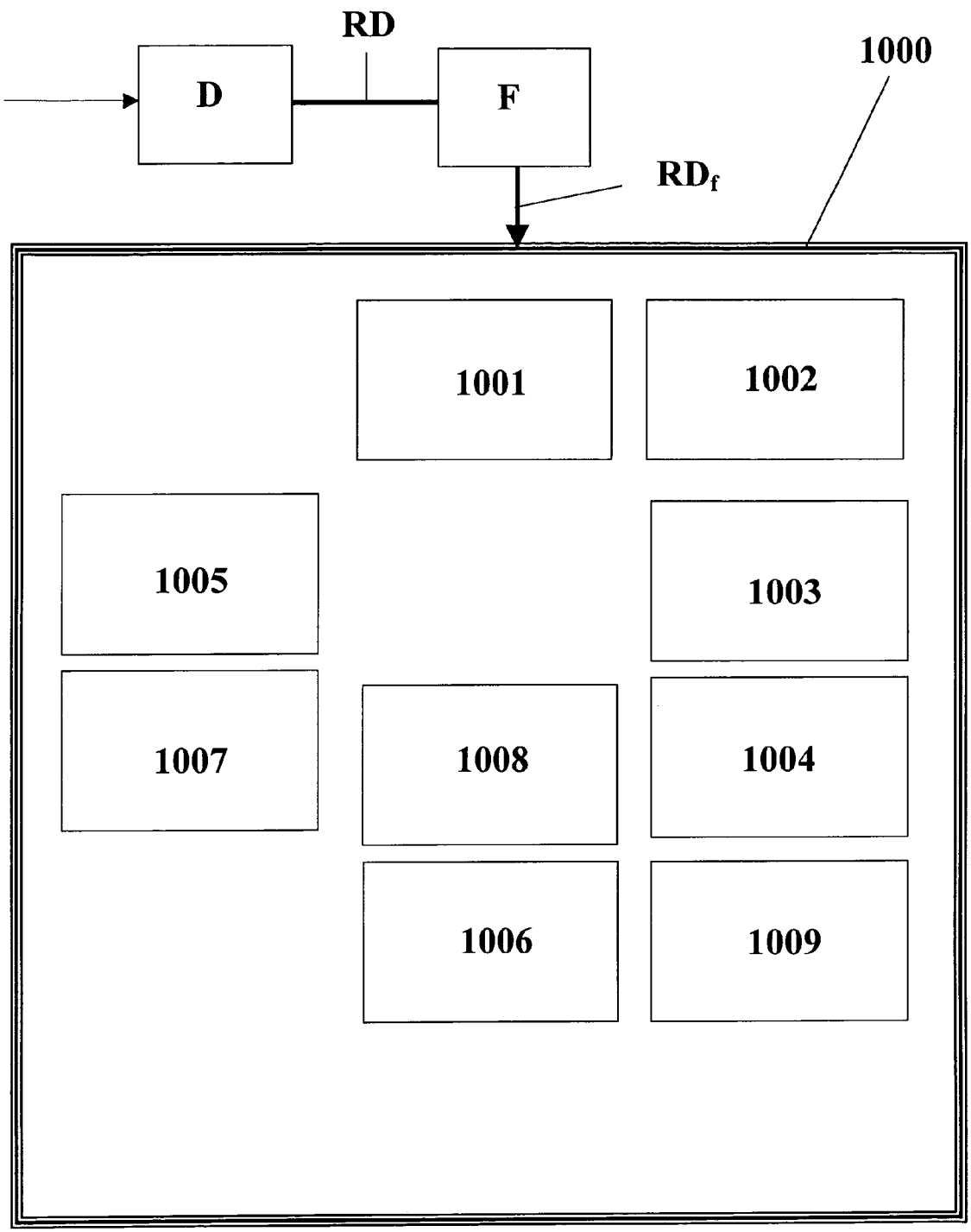
FIG. 15 is a diagram of the Health of Burning Structures Process.

As shown in FIG. 15, the Health of Burning Structures (hereinafter HOBS) process (1000) includes applying several signal processing methods to analyzing, monitoring and displaying collapse indices of data (acceleration responses) obtained from one or more of device D (hereinbefore identified as systems (1), (101), (201), (301), (401), (501), (601), (701), (801) or (901)). These signal processing methods include (but are not limited to) Power Spectral Density Analysis (1001), Root Mean Square Analysis (1002), Signal Bandwidth Analysis (1003), Maximum Entropy Method Analysis (1004), Random Decrement Analysis (1005), The Hilbert Transform (1006), Shock Response Spectrum (1007), Wavelet Transform Analysis (1008), and the Damping Estimation Analysis (1009). HOBS (1000) offers numerous user controllable parameters and options such as a 500 ms update rate of all indicators when used on a portable computer (such as a standard laptop). HOBS (1000) can be utilized on-site or remotely through wired or wireless means. As discussed above, one or more of device D obtains acceleration responses in analog or digital form. In cases where the device D obtains analog responses/data, it is first amplified, filtered and converted into a digital format. Once in digital format the digital data acquired from one or more of device D is the raw data signal RD that is needed for the HOBS (1000) process.

Also as shown in FIG. 15, The raw data signal RD is then passed through band-stop filters F to remove known signal noise such as the 60 Hz cycles generated by electric grids and fluorescent lights, or other noise sources such as those generated by vehicle engines, fire apparatus engines and other emergency equipment. The filters F are automatically selected by locating frequencies whose magnitude is a greater than eight standard deviations above the mean frequency amplitude in the signal RD. These frequencies are identified by analysis (discussed below) where the magnitude of signal spikes are calculated. If the magnitude of these spikes exceed 8 standard deviations from the mean frequency amplitude, the frequency of the spike is added to the collection of band-stop filters F and that component of the raw data signal RD is removed. Frequencies whose magnitude is greater than eight standard deviations above the mean frequency magnitude are out of the range of natural structural response. The filters F may also be manually selected or added by the user to remove signal frequencies contributed by known sources. Filtering signal frequencies unrelated to the structure provides a purer signal that is available for analysis. The filtered raw data signal $RD_f$ is then utilized in the HOBS (1000) process discussed below.

Figure 16A:
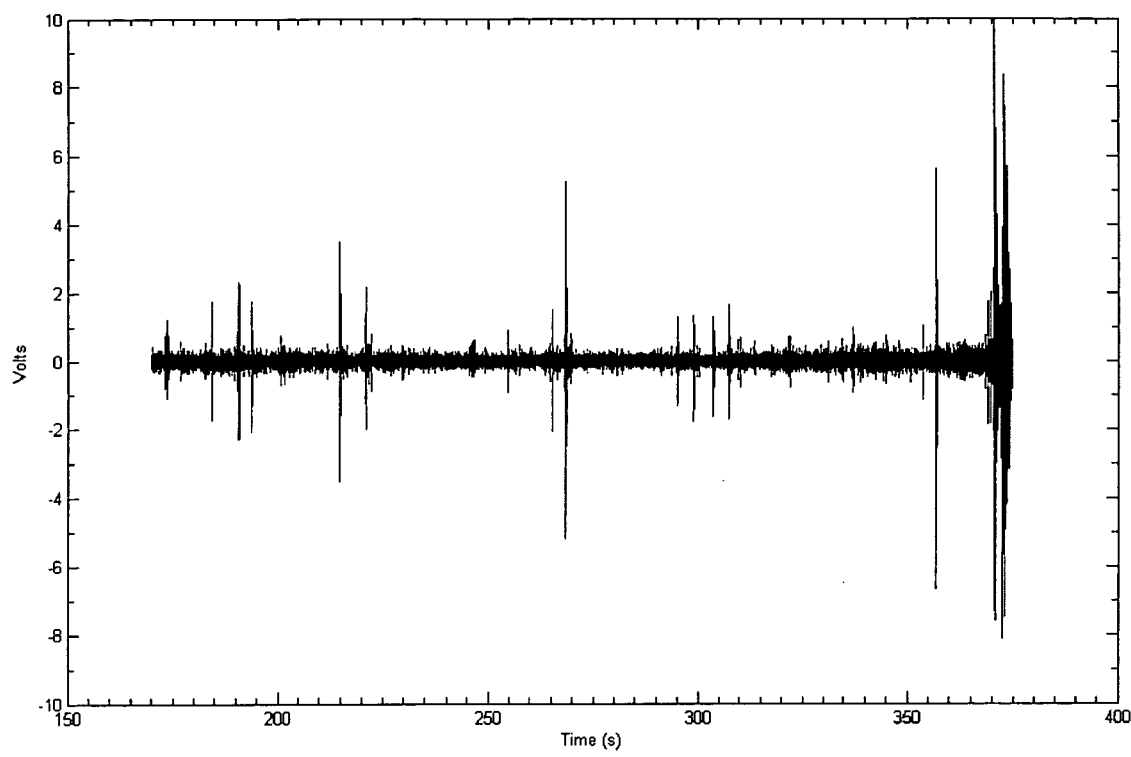
FIG. 16(a) is an example of a display of filtered raw data signal $RD_f$ from multiple devices.
Figure 16B:
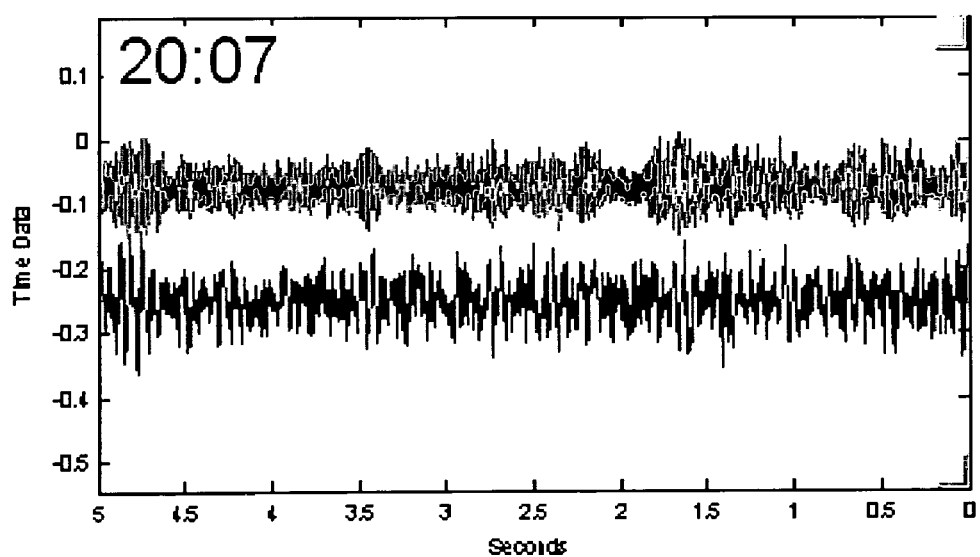
FIG. 16(b) is an example of a close up display of filtered raw data $RD_f$ from multiple devices.

FIG. 16(*a*) is an example of a display of filtered raw data signal $RD_f$ from multiple devices D (not shown). The data signal $RD_f$ indicates peaks corresponding to raw magnitude transients throughout the signal. The signal $RD_f$ increases in magnitude as the structure approaches collapse since magnitude is always indicative of collapse. Generally, data signals are offset from zero. Signals center about zero if the system offsets and biases are properly calibrated.

FIG. 16(*b*) shows an exemplary close up display of filtered raw data $RD_f$ from multiple devices D (not shown). The shown offset from zero (time) is for display purposes only. Scales may also be adjusted to view longer data trends or shorter signal responses.

(a) The Power Spectral Density Analysis:

The Power Spectral Density (1001) is obtained by applying a Fast Fourier Transform to the filtered raw data signal $RD_f$ to reveal the component frequencies within the data signal $RD_f$. The Fast Fourier Transform is based on the premise that a given signal can be approximated by the sum of many sinusoids of varying amplitude, frequency, and offset. Used in generating the Power Spectral Density, Fast Fourier Transform is ideally suited for detecting the component frequencies when those frequencies are sustained throughout the signal.

Figure 17:
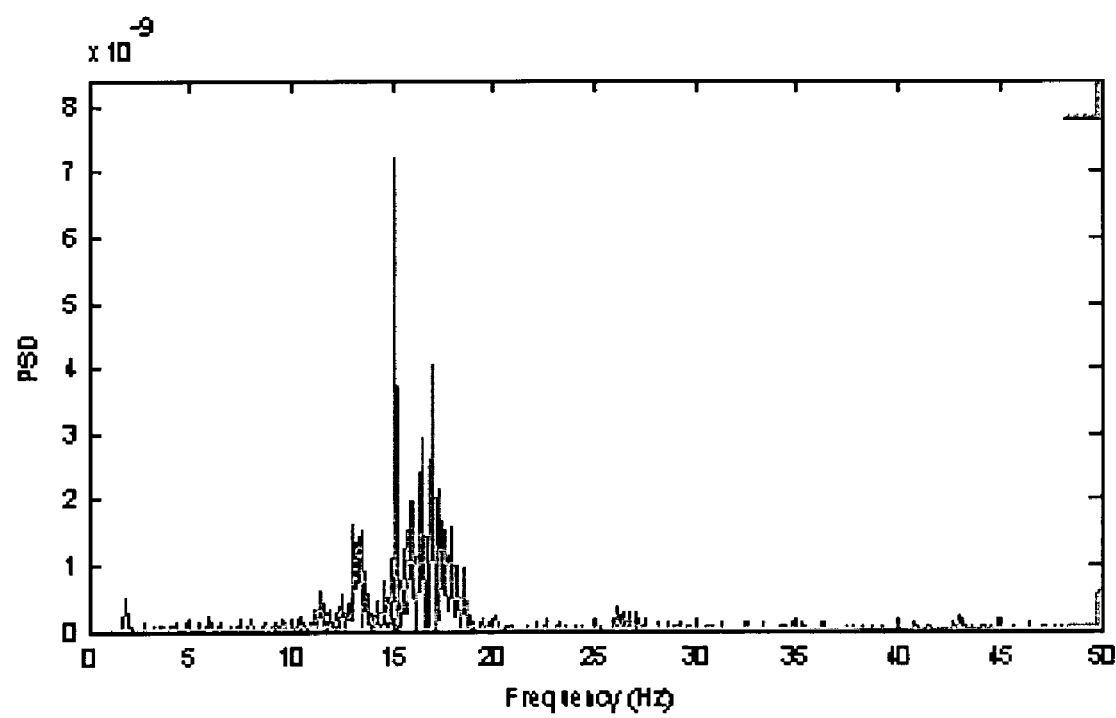
FIG. 17 shows exemplary component frequencies in raw data RD for a structure being monitored.

FIG. 17 shows exemplary component frequencies in raw data RD for a structure being monitored. The peak frequencies revealed by the Power Spectral Density Analysis (1001) also indicate frequencies that should be added to the band-stop filters F (discussed above and not shown in this figure). To reduce the effects of transients and other error sources, the used or displayed Power Spectral Density (1001) is calculated from overlapping ten-second blocks of data.

Power Spectral Density (1001) is calculated using equations (1) and (2):

$$\text{Power Spectral Density} = \frac{(F[y(t)])^2}{N}$$

where $$F[Y(t)] = Y(\omega) = \sum_{j=1}^{N} y(j)(e^{-2\pi i/N})^{(j-1)(\omega-1)};$$

and where
y(t) is the $RD_f$ expressed as a function of time
ω=2nf=is the frequency expressed in radians/second
Y(ω) is the Fast Fourier Transform of y(t), expressed as a function of frequency
N is number of data points in y(t)
e is the universal constant
j is the summation index (where y(j) is the $j^{th}$ time instant of y(t)).

Thus, the component frequencies, based on equation (1) and (2) above create a data set of the magnitude of a given frequency's contribution to the $RD_f$ signal.

The results as shown in FIG. 17 indicate significant contributing signal components at 15 Hz, 15.2 Hz, and 17.5 Hz. These frequencies are added to the band stop filtering to improve the accuracy of subsequent calculations and analyses.

(b) Root Mean Square Analysis:

A Root Mean Square Analysis (1002) is applied to data signal $RD_f$ to capture the average magnitude of the data signal $RD_f$. Root mean square values (rms) for Root Mean Square Analysis (1002) are calculated using equation (3):

$$X_{\text{rms}} = \sqrt{\frac{\sum_{j=0}^{N} x(j)^2}{N}}$$

Where
$X_{rms}$ is the root mean square value in current time
$x_j$ is the $j^{th}$ time instant of the data $RD_f$
N is the number of time instances in x.

EXAMPLE

If the most recent 10 seconds of data re used to calculate the current root mean square value, and the sampling rate is 1000 samples/second, then N is 10,000.

The tracking of the rms and their changes over time creates the Root Mean Square Analysis (1002) from which data trends and magnitudes are evaluated in assessing a risk of collapse.

Figure 23:
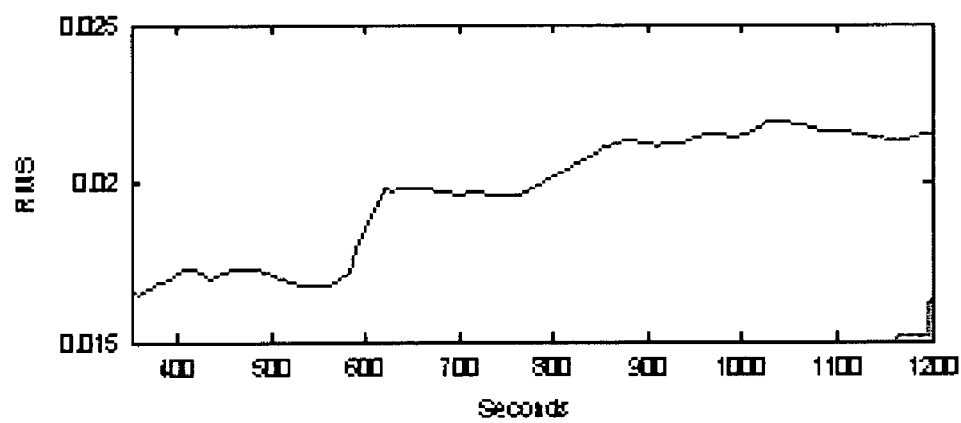
FIG. 23 shows exemplary increases in the magnitude of the Root Mean Square value.

As a structure becomes less stable, the magnitude of the energy absorbed by a structure and its inability to dissipate existing energy is depicted by an increase in the magnitude of the rms value. This scenario is exemplified in FIG. 23. Users of the HOBS will use this information to set a threshold for the magnitude of, or a rate of change in the Root Mean Square Analysis (1002) to determine when interior operations by emergency workers is no longer tenable and the risk of collapse to great. Large step-like changes indicate regions of concern, whereas flat regions are indicative of sustained behavior. As this data typically represents a long-term trend for the structure, a display of this data will generally run from the beginning of data acquisition through the current time, or from the most recent (typically 10+ minutes of) data. When running in real-time, the Root Mean Square Analysis (1002) itself will use the previous recent data (15–30 seconds typically) to create a value for each point in time.

Figure 19:
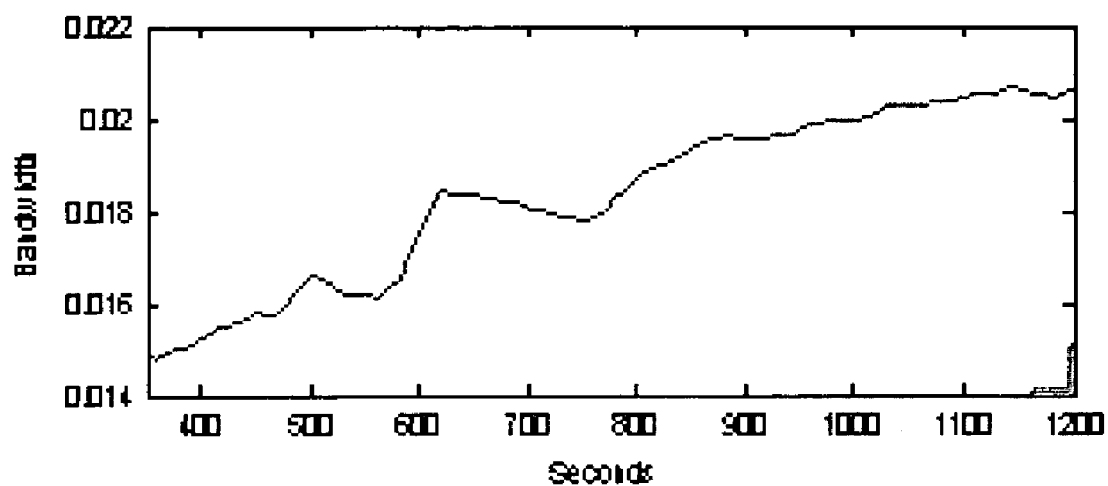
FIG. 19 shows the effects of a change from a single solid system to many loosely connected systems.

(c) A Signal Bandwidth Index Analysis:

A Signal Bandwidth Index Analysis (1003) is derived from the data $RD_f$. This index is representative of the changes in the joints and connections of a structure that begin to break apart as the structure burns and quantifies the overall spread of frequencies in the signal. As exemplified in FIG. 19, the structure, initially modeled as a single solid system, vibrating in a narrow band of dominant frequencies, is transformed by the fire into many loosely connected systems, vibrating across a greater range of frequencies. The effect of this change is that these loosely connected systems spread their signals across a greater bandwidth spectrum. The Signal Bandwidth Index Analysis (1003) is calculated using equation (4):

$$B = \sqrt{\int_{-\infty}^{\infty}(f-f_m)^2|X(f)|^2 df}$$

Where:
X(f) is the Fourier Transform of the signal $RD_f$
B is the frequency bandwidth of the signal
f is the frequency of the signal in Hz
$f_m$ is the averaged frequency of the signal $RD_f$ (d) The Maximum Entropy Method Analysis A Maximum Entropy Method Analysis (1004) is used as an alternative to the Power Spectral Density Analysis (1001) for evaluating data signal $RD_f$ of a short duration with a high sample rate. The Maximum Entropy Method Analysis (1004) is used as an inversion technique in a numerous scientific fields including astronomy, mass spectrometry, the calculation of electron densities and Nuclear Magnetic Resonance. In the present invention, the Maximum Entropy Method Analysis (1004) is used as an alternative to the Fourier transform, providing noise suppression in regions where the signal $RD_f$ is absent or insignificant.

The principle of maximum entropy as disclosed in http://encyclopedia.thefreedictionary.com/Principle%20of%20Maxim um%20Entropy is incorporated herein by reference. Developed by Claude E. Shannon, the principle of maximum entropy is a method for analyzing the available information in order to determine a unique epistemic probability distribution. The measure of uncertainty for a probability distribution ($H(p)=-\Sigma p_i \log p_i$) has been named information entropy. Information entropy is a function of a given probability distribution. The development of the principle of maximum entropy has led the inventors of the present invention to the inventive conclusion that the converse of this principle, ie., a probability distribution can be determined using the information entropy concept. It states the probability distribution that uniquely represents or encodes the state of information is the one that maximizes the uncertainty measure H(p) while remaining consistent with our information.

Figure 20:
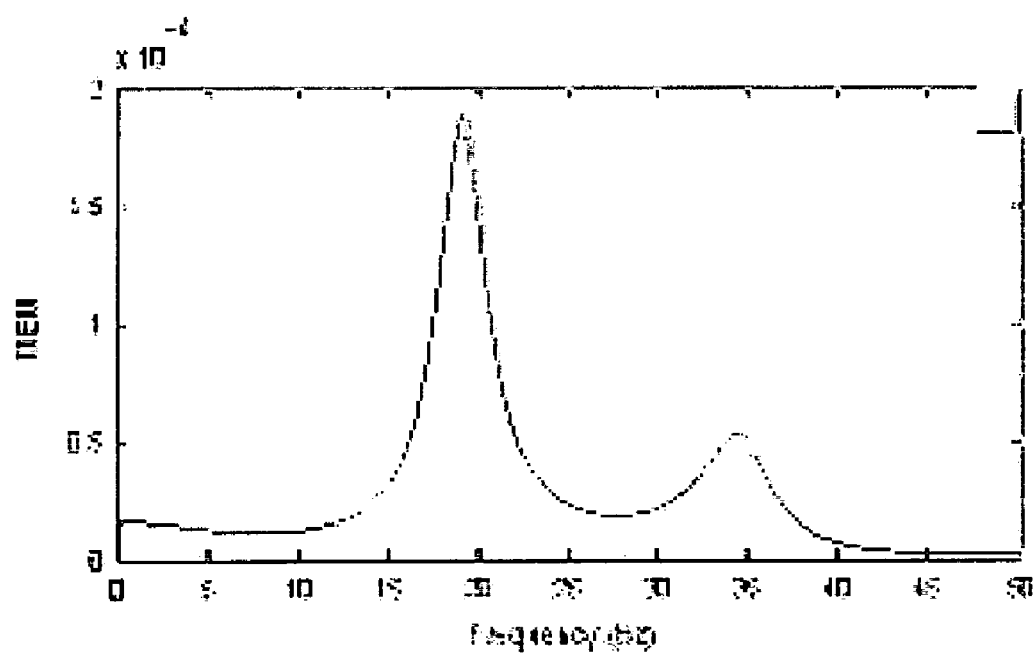
FIG. 20 is an amplitude vs. frequency analysis to show a structure's impulse response.

As exemplified in FIG. 20, this amplitude vs. frequency analysis provides information to predict the structure's impulse response. As the building's ability to return to an initial state after an impulse degrades, the Maximum Entropy Method Analysis (1004) peak sharpens and narrows.

The Maximum Entropy Method Analysis (1004) is described using equation (5):

$$H(f) = -\sum_{i=0}^{f_x} p_i \ln p_i$$

where
$f_x$ Cutoff filters max frequency
$P_i$ probability at frequency i

The Maximum Entropy data is used to calculate a damping measure, ζ, by using the −3 dB bandwidth. This is accomplished by determining the bandwidth of the Maximum Entropy, w, 3 dB below the Maximum Entropy peak. ζ is then calculated by equation (6):

$$\zeta = \frac{1}{2}\frac{w}{f_r}$$

where,
$f_r$ frequency of the MEM peak
w Maximum Entropy bandwidth at −3 dB from peak (e) The Random Decrement Signature Analysis The Random Decrement Signature Analysis (1005) is a method of averaging time data of a dynamic system, such that the response of the structure due to initial velocities and excitations are averaged out, leaving only the response of the structure due to initial displacement. The Random Decrement Signature Analysis (1005) measures the "twang" of the structure. In exemplary language, a "twang" is the method of measuring the response of a diving board if it were pulled back and released, whereas "resonance" is the frequency at which the diving board vibrates. Thus, the Random Decrement Signature Analysis (1005) provides information on the health of a structure through damping evaluation.

Figure 21A:
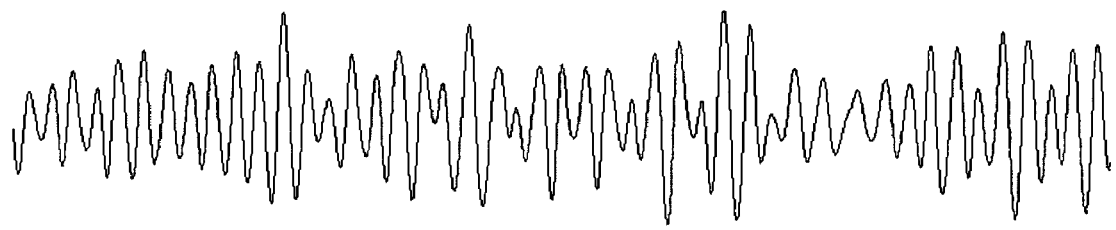
FIG. 21(a) shows a Random Decrement Signature Analysis for a 15 to 30 second block of data.
Figure 21B:
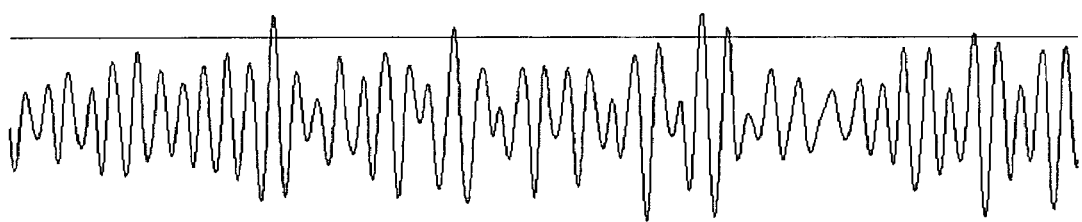
FIG. 21(b) shows a threshold signal for a Random Decrement Signature Analysis.

The Random Decrement Signature Analysis (1005) begins by utilizing a block of most recent data from data signal $RD_f$ (typically 15 to 30 seconds). This block is passed through a digital (software based) bandpass filter (not shown) having limits that are based on the dominant frequency present in the signal $RD_f$. As exemplified in FIG. 21(a), a 15 to 30 second block of data is extracted. Thereafter and as exemplified in FIG. 21(b), a threshold signal is determined. The value of the threshold level is chosen such that in each block of data, there is a set number of times that the magnitude of the filtered raw data signal $RD_f$ crosses the threshold level. For speed of processing, the number of crossings (also known as data windows) can vary to a small degree so long as the actual number of crossings is utilized in the averaging function. For example, if the number of crossings is 300, a 20 crossing deviation will not effect the final analysis, utilizing the averaging function. It is important to note that the time and crossing values are exemplary. Specific chosen values may be changed to suit specific data acquisition needs. While larger blocks of data create greater accuracy, they may create an artificial delay in real-time results.

Figure 21C:
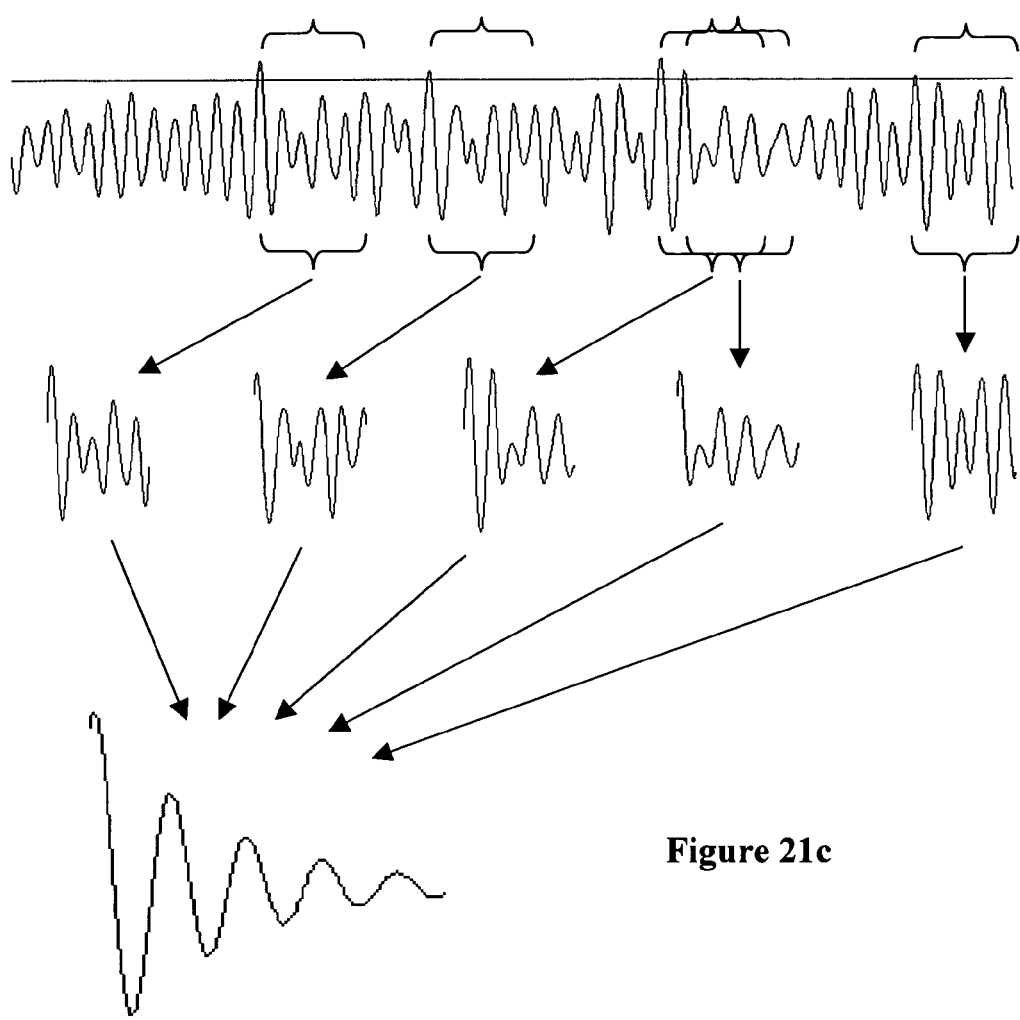
FIG. 21(c) exemplifies an extract data block.
Figure 21D:
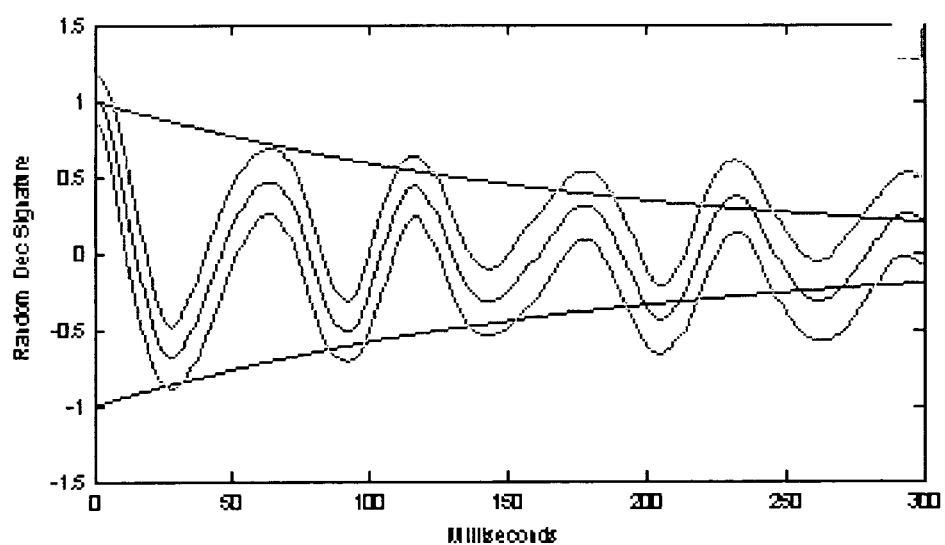
FIG. 21(d) exemplifies the averaging of each of the data blocks into a single signal.

FIGS. 21(c) and 21(d) exemplify extract data blocks of 200–1200 ms after each threshold window. Here, each display interval (identical in size to the data window and typically 1 second, shown as 300 ms) represents the sum of identically sized windows of data generated each time a threshold value is crossed. The data represents the structure's return to stability after energy, in this case fire induced vibrations, has been added to the structure. Also shown are the standard deviation values used to assess the quality of the data represented in each window and the expected decay. The decreasing sinusoid represents a healthy structure, the narrow standard deviation envelope represents good data quality.

A display interval Random Decrement Signature is calculated by selecting a block of the most recent filtered raw data $RD_f$ (typically at 15 seconds). This block is passed through a digital (software based) bandpass filter having limits based on the dominant frequency present in the signal $RD_f$. It is important to use the filtered raw data $RD_f$, as this has removed many of the known contributing frequencies (such as 60 Hz noise, or vibrations from the fire apparatus engines) and secondary resonances, because the Random Decrement Signature analysis experiences interference when the data contains significant contributions from multiple frequencies. A threshold value is then calculated by determining at which signal amplitude a set number of peaks, N, (typically 300) cross that value within the selected data block.

If a larger data block is used (eg. 30 seconds) then the used number of threshold crossings is also increased. Likewise if smaller data blocks are used, the number of threshold crossings used will be accordingly decreased. For the purpose of analysis, the critical point is that enough threshold crossings are used such that sum of the data windows created by each threshold crossings can create an adequate Random Decrement Signature such that a ζ value can be calculated using either the Hilbert Transform (1006), discussed below or a Log Decrement calculation. Each time the threshold is crossed, a new data window is created by starting with the peak of the threshold crossing and continuing for the subsequent time interval (typically 200 ms to 1.2 sec). As it is likely that a new data window will be created before previous ones have closed, a single data point may appear many data windows, however will be time shifted according to when the window started. The window size needs to be sufficient such that a ζ value can be calculated using either the Hilbert Transform (1006) or a Log Decrement calculation. A new data window is created each time the threshold is crossed. This will generally require that the display window encompass 4–5 or more oscillations. All of these (typically 300) data windows, are averaged together to derive the Random Decrement Signature (RDS) by equation (7):

$$RDS(t) = \frac{\sum_{i=0}^{N} DW_i(t)}{N}$$

Where:
N Number of data windows
$DW_i$ Data Window

As a measure of the quality of the Random Decrement Signature (RDS) data, the standard deviation of each RDS data point is also calculated using equation (8):

$$RDS_{SD}(t) = \sqrt{\frac{\sum (x_i(t) - \bar{x}(t))^2}{N}}$$

Where
$x_i$ value of RDS at time (t) for each data window
$\bar{x}$ average value of RDS at time (t)

As each data value in the Random Decrement Signature Analysis (1005) is created as the mean of approximately 300 data points used to generate it, the standard deviation of the 300 data points from that mean will have a direct correlation on the quality of the incoming signal data $RD_f$. Particularly as each data point is taken from the filtered data $RD_f$, since the data signal $RD_f$ is a combination of all the underlying structural responses. A high standard deviation at any given data point can be expected. However, the consistency in the magnitude of the standard deviation from one data point of the Random Decrement Signature Analysis (1005) to the next is a measure of the quality of the Random Decrement Signature Analysis (1005). Too great a variation from one data point to the next would be indicative of a poor Random Decrement Signature Analysis (1005) and suggest the necessity of a greater number of windows in the average.

The standard deviation can be plotted to either side the RDS data, creating an envelope around the RDS data. Owing to the size of the standard deviation, vs. the scale of the RDS data; however, typically ±¼ the $RDS_{SD}$ is shown to create the envelope.

(f) A Hilbert Transform Analysis

Figure 22A:
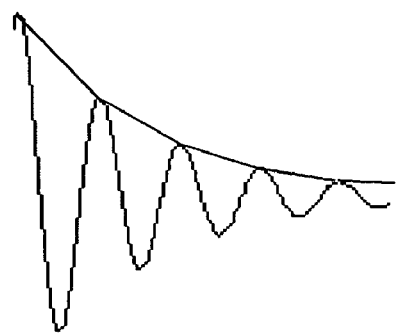
FIG. 22(a) shows a magnitude for the decay of the Random Decrement Signature oscillations.

A Hilbert Transform Analysis (1006) is applied to the resulting Random Decrement Signature Analysis (1005) data to determine a ζ value of the structure damping. The effect of the Hilbert Transform is to apply a 90° phase-shift to the signal to derive an analytical signal. This creates a magnitude for the decay of the Random Decrement Signature oscillations as shown in FIG. 22(a). The decay σ is calculated by the following equations (9):

$$|H^\nabla(t)| = e^{-\sigma t}$$

Where:

$H^\nabla(t)$ is the analytical signal created by the Hilbert Transform Thus, ζ, is calculated by equation (10):

$$\zeta = \frac{1}{2\pi f_n} \frac{d}{dt}\left(-\ln|H^\nabla_{(t)}|\right)$$

Where:
$f_n$ is the dominant frequency of the Random Decrement Signature Analysis (as used in the bandpass filtering step).

Figure 22B:
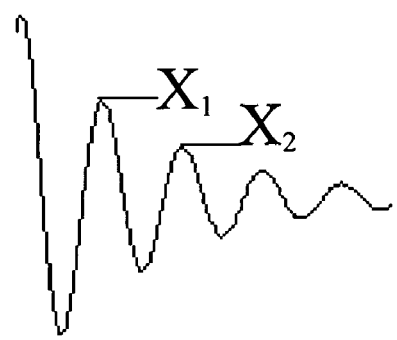
FIG. 22(b) shows two selected peaks from the Random Decrement Signature oscillations.

An alternative method for calculating ζ from the Random Decrement Signature Analysis (1005) is to use a Log Decrement method. In this calculation, two adjoining peaks ($x_1$, $x_2$) are selected from the Random Decrement Signature oscillations, as shown in FIG. 22(b). The calculations use equations (11) and (12):

$$\delta = \ln\left(\frac{x_1}{x_2}\right)$$

-continued $$\zeta = \frac{\delta}{\sqrt{4\pi^2 + \delta^2}}$$

Both the log decrement method and the Hilbert Transform Analysis (1006) create envelopes to profile the decay of the Random Decrement Signature oscillations. In the case of the Hilbert Transform (1006) this envelope is generated through the entire transient space where in Log Decrement, the envelope is generated from just the peaks of the Random Decrement Signature oscillation.

(g) The Shock Response Spectrum Analysis

Figure 18:
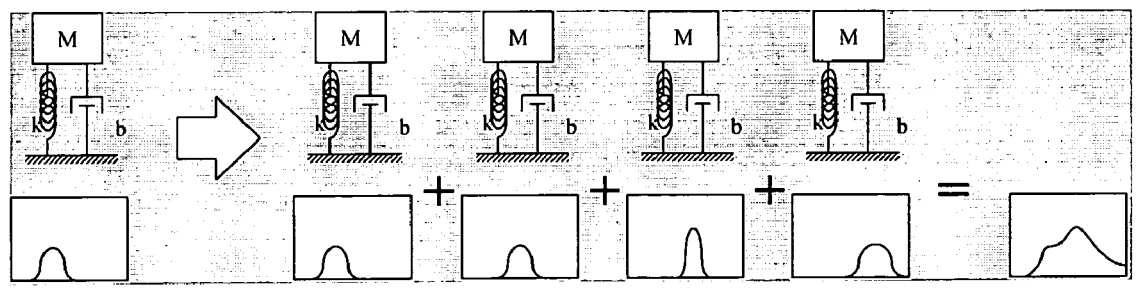
FIG. 18 shows the Shock Response Spectrum.

The Shock Response Spectrum Analysis (1007) also known as the "Fire Shock Spectrum," is calculated using either the filtered raw data $RD_f$ or the Random Decrement Signature (1005). The Shock Response Spectrum Analysis (1007) is an alternative to using the fast Fourier Transform derived Power Spectral Density (1001) to identify dominant resonant activity. The Shock Response Spectrum, as shown in FIG. 18, is analogous to the maximum response of a basic, single degree of freedom mechanical system computed over the frequency spectrum. For the model, a very small value of damping (b) is selected (close to zero) and the ratio of the mass (M) and the spring constant (k) are varied over a set range in order to achieve a range of model resonant frequencies. Where the (mass/spring/damper) model's varied resonant frequencies overlap the signal energy are points of maximum model response and correspond to peaks in the Shock Response Spectrum. This decomposes the input signal (Raw Filtered Data or Random Decrement Signature) mechanically (it could also be decomposed into the sinusoidal Power Spectral Density or Maximum Entropy components). This data can be represented as a 3-axis data set of frequency vs. amplitude over time. This time is over the entire time history to allow for tracking of gradual changes in frequency and magnitude.

(h) The Wavelet Transform Analysis

Figure 24A:
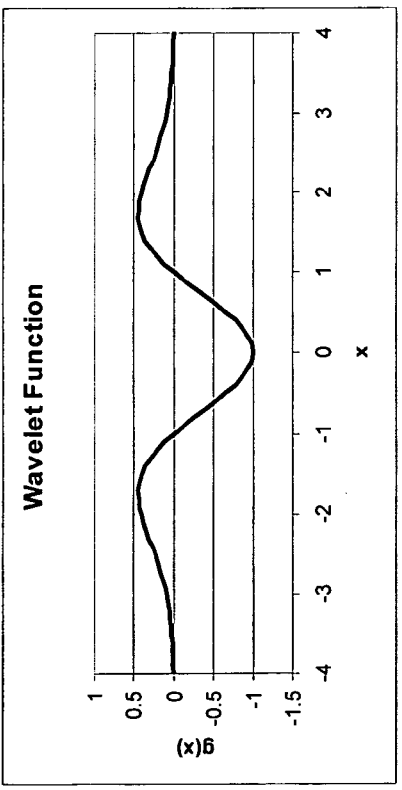
FIG. 24(a) shows a comparison between wavelet function and sine function.
Figure 24A:
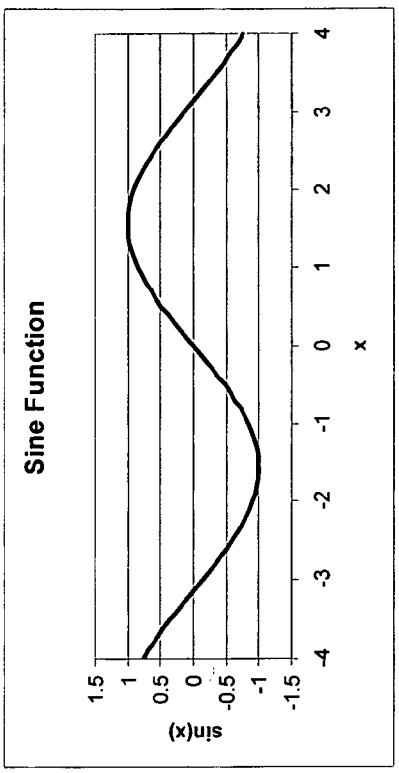
Figure 24C:
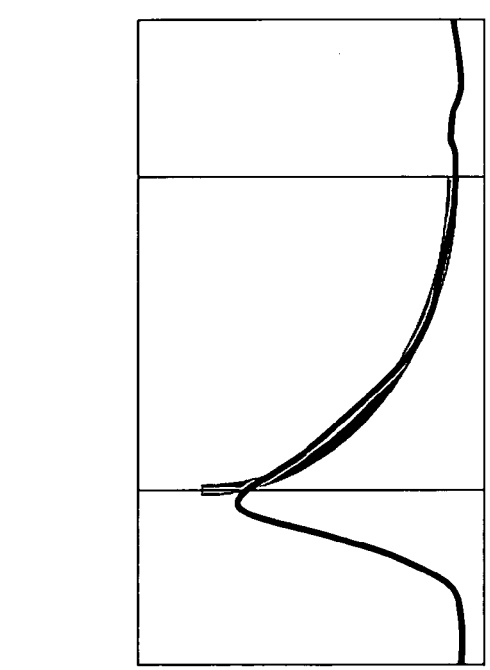
FIG. 24(c) shows the "Crop" method for wavelet intensity ratio.
Figure 24B:
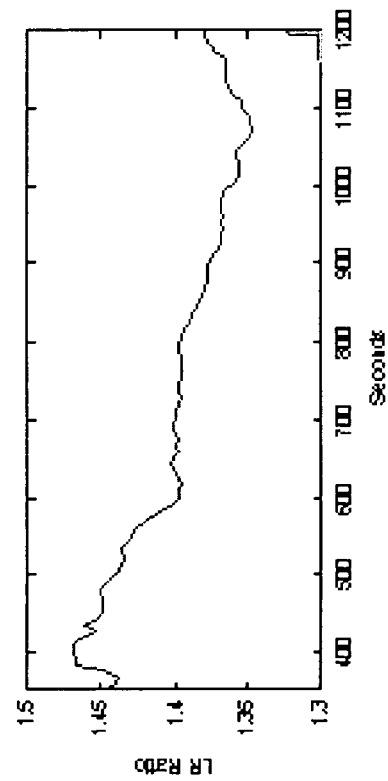
FIG. 24(b) shows the "Flip" method for wavelet intensity ratio.

The Wavelet Transform Analysis (1008) is based upon using a wavelet function (such as the "Mexican Hat" and "Mortlet" wavelets) to match the decaying oscillations of the Random Decrement Signature. As shown in FIG. 24(a), wavelet functions are ideally suited to decaying oscillations, because unlike sinusoids, the magnitude of a wavelet approaches zero the further out it travels. Because the effectiveness of identifying component frequencies by Fast Fourier Transforms diminishes when the frequency itself is a decaying rather than sustained oscillation or changing over time, the eventual drop to zero in a Wavelet function ($g_2$) makes them a better choice for analyzing signals that change over time, such as the Random Decrement Signature (1005). The Wavelet Transform Analysis (1008) is based on a premise similar to the Fast Fourier Transform, that a given signal can be approximated by the sum of many wavelets of varying amplitude and width (scale), frequency, and offset. Like sinusoids, a characteristic for wavelets functions is that the sum of the area under the curve of the function is zero. The wavelet length and frequency are varied. Where the wavelet best matches the frequency of the Random Decrement Signature (1005) are the points of highest intensity. This mapping is plotted as the three-axis (surface plot) of the wavelet function versus intensity over time of the Random Decrement Signature (1005). The wavelet transform will also pick up competing frequencies (additional peaks in the surface plot) that may be candidates for removal through the band-stop filters. Relevant data for the frequency scale of the wavelet plot is limited to the cut-off frequencies implemented in the hardware amplifiers and filters of the system. The Wavelet Transform Analysis (1008) is calculated using equation (13):

$$g_2(x) = (x^2 - 1)^{-x^2/2}$$

$$f_2(k, t) = \sqrt{k} \int_{-\infty}^{+\infty} f(y) g_2(k(y-t)) dy$$

Where:
k is the wavelet scale
t is time
$g_2(x)$ is the wavelet function; and
y is a placeholder variable used in the convolution.

The wavelet intensity ratio is calculated in one of two methods. A graph of exemplary results of the "Flip" method wavelet intensity ratio over time is shown in FIG. 24(*b*). In the "flip" method, the volume under each half of the surface plot, dividing at the time axis halfway point, is calculated and a ratio of the left half vs. the right half is derived. The resulting ratio is plotted over time, typically displaying the most recent 10 or more minutes so that changes in the ratio trend over time can be observed as calculated by equation (14):

$$I_{ratio} = \frac{\int_{t=0}^{T/2} \int_{f=0}^{f_x} I(f, t) df dt}{\int_{t=T/2}^{T} \int_{f=0}^{f_x} I(f, t) df dt}$$

Where
T is time (size) of RDS data window
$f_x$ is Hardware frequency cutoff
I is the wavelet intensity as a function of frequency and time.

An alternative method for calculating the wavelet intensity ratio is the "Crop" method as shown in FIG. 24(*c*). In this method, the amplitude and frequency data are once again "squashed" leaving a time versus intensity dataset as shown in equation (15):

$$C(t) = \int_{f=0}^{f_x} I(f, t) df$$

Where:
C is the resulting data
I is the wavelet intensity as a function of frequency and time The data prior to T/4 and data following 3T/4 are then removed. The resulting data (C) will have the typical appearance of the decaying (damping) curve, and is in fact used to calculate ζ in equation (16):

$$\sigma = \frac{-\ln\left(\frac{C}{A}\right)}{t}$$

$$\zeta = \frac{\sigma}{w_n}$$

Where:
A is the peak amplitude
$W_n$ is the dominant frequency of the Random Decrement Signature As the "Flip" method intensity ratio approaches 1 (typically a value higher than this is used, like 1.3), the structure is approaching a region of instability. Likewise, as the "Crop" method ζ value approaches 0, is also approaching a region of instability where the (fire induced) oscillations are no longer dampened, but sustained. Each of these data sets can be used to extrapolate when the data is likely to cross into the region of instability. A slope for a recent set of data is calculated, and the intersection of a line with this slope, starting at the end of the current data values, is used to estimate how much time exists before the cross-over to the unstable region is reached.

(i) The Damping Estimate Index Analysis:

The Damping Estimate Index Analysis (1009) is a measure of the width of the decay in the Random Decrement Signature envelope. As exemplified in FIG. 25(*a*), a damping value above zero is indicative of a stable structure. Damping below zero indicates an unstable structure with a high risk of collapse. The damping value, ($\zeta_b$), can be derived by a number of methods including the −3 dB bandwidth damping value ($\zeta_b$), shown in FIG. 25(*b*), the Hilbert Transform (1006) damping value ($\zeta_h$), the Log Decrement method, as shown in FIG. 22(*b*), having a damping value ($\zeta_l$) and the Wavelet Intensity Ratio "Crop" method as shown in FIG. 24(*c*) having a damping value ($\zeta_w$). Each of these estimates may be used individually, averaged, or weighted averaged in subsequent calculations utilizing the damping estimate as per equation (17):

$$\zeta_b = W_b \zeta_b + W_h \zeta_h + W_l \zeta_l + W_w \zeta_w, W_b + W_h + W_l + W_w = 1$$

Where
$W_i$ relative weight factor

Figure 25A:
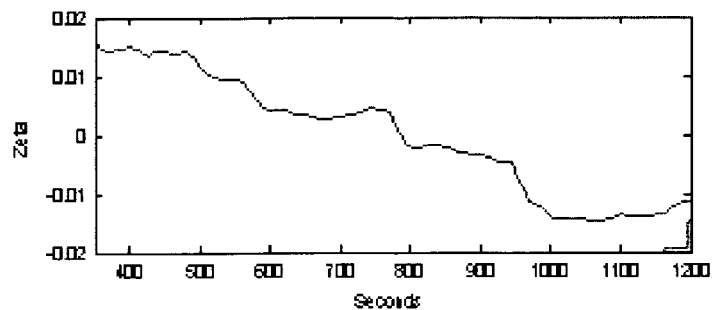
FIG. 25(a) shows a Damping Estimate Index Analysis for a Structure.
Figure 25B:
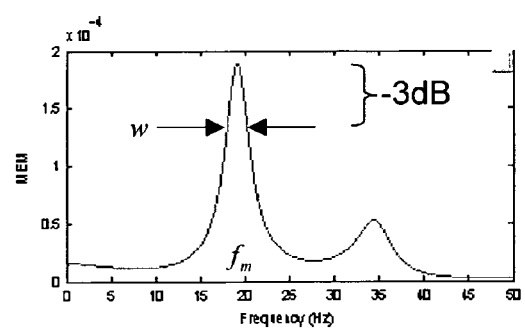
FIG. 25(b) shows the −3 dB Bandwidth of the Maximum Entropy Method Analysis.
Figure 25C:
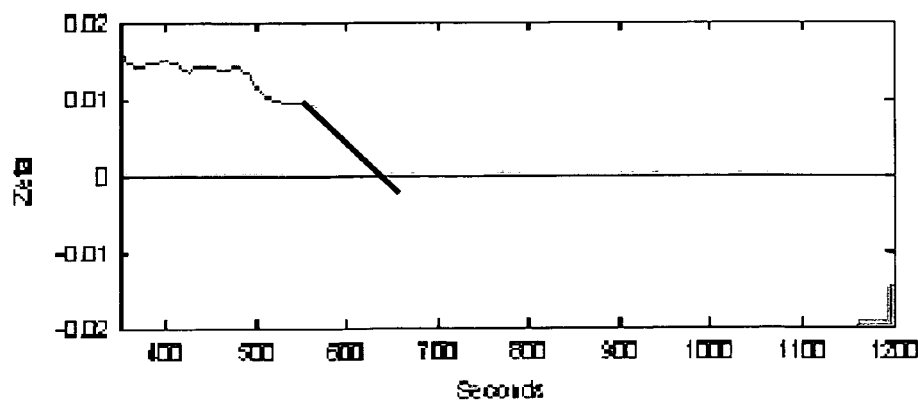
FIG. 25(c) shows the relative weight factor in determining instability of a structure.

An estimate for how long before a structure will reach the region of instability can be derived by calculating the slope of the most recent damping data and extrapolating where (when) that data is likely to cross the zero axis is shown in FIG. 25(*c*). The accuracy of this estimate is highly dependant upon a how much data is used (typically the most recent 10–30 seconds) to create the slope. Using the entire data set is unlikely to be accurate as a fire's progression exponentially damages the structure and a linear slope fit is unlikely to capture this effect. Likewise, only using small amount of the most recent data is likely to highly influenced by transient events, creating exaggerated estimates. It is important to note that this is not a prediction for when the structure will collapse, as there are far too many variable including the specifics of the structure design, environmental factors, and fire suppression activities, to indicate when a structure will collapse, however, it can be used as a tool to evaluate the health of the structure, combined with other experiences to evaluate how long interior operations in a structure may be allowed to continue before the risk of a collapse is too great or too close in time, necessitating an evacuation of personnel within the structure before a collapse. For these same reasons, the damping time estimate is also a moving target that constantly updates based on the most recent data available.

No single index or time estimate is accurate enough across most situations that it should be used exclusively in determining the risk of structural collapse. As the structure continues to degrade and becomes less able to dissipate the energy from the fire induced vibrations, more and more of the indices approach their thresholds for areas of concern. Taking this into account, a Weighted Combined Collapse Index is derived by taking weighted averages of the other indices themselves, or of the proximity of the index to its areas of concern. As described in the creation of a weighted damping estimate, a scaling factor can be applied to each of the other indices to derive a unified index for the risk of structural collapse. The development of such an index is important because when a collapse detection device is attached to a burning structure, it will be fire fighters and other rescue workers, not trained researchers, making the determination as to structure's risk of collapse. This system is intended to be a tool to assist them in this decision making process, as such, the tool must provide simplified answers estimating the level of risk. This combined index is intended to be the simplified summary of the underling indices.

As with the damping and wavelet ratio indices, a threshold value for the region of structural instability can be used in conjunction with extrapolations of the slope (trend) of the Weighted Combined Collapse Index to create a rough estimate of the time, given current trends, before the structure reaches a point of unacceptable risk for collapse. This estimate is used to assist in decisions relating to the continuation of interior operations or the distribution of fire suppression resources. It is important to note that this is not an absolute prediction for when the structure will collapse. Given that the change of a fire over time is unpredictable and accounting for other variables such as the specifics of the structure design, environmental factors, and fire suppression activities it is understood to one of ordinary skill that precise indication of a structure collapse is not the focal point of the present invention. Rather, the present invention is directed to the evaluation of the health of a structure, that, in combination with other factors will allow one to evaluate how long interior operations in a structure may be allowed to continue before the risk of a collapse is too great or imminent, necessitating an evacuation of personnel from the structure before collapse. For these same reasons, the Weighted Combined Collapse Index time estimate is dependent upon constant updates based on the most recent data available. Thus, a change is condition will alter time estimates.

Processing the collapse index analyses at a single base unit where the limitations of processing power, memory, size, and operational power are significantly reduced is a relatively straightforward process of adapting each of the analysis tools (1001) to (1009), discussed above. However, in configurations of the monitor for the detection of the onset of structural collapse where data transmission bandwidth is reduced by performing more processing locally at the site of the sensor, it the system can be adapted to utilize fewer of the analysis tools (1001) to (1009), to minimize the memory and processing requirements. Reducing the bandwidth of transmission is of value because of the scarcity of wireless radio spectrum suitable for data transmission that does not interfere with, and is not corrupted by, other radio sources, including equipment critical to other fire ground operations. As such, rather than transmitting up to 1000 samples per second of 16 bit raw data, the information can be reduced to simply transmitting the results of some 12 or so indices, once per second.

What is claimed is:

1. A method of detecting the health of a structure so as to determine structural collapse comprising:
    (a) utilizing a Health of Burning Structures system having at least one of a Power Spectral Density Analysis, a Root Mean Square Analysis, a Signal Bandwidth Analysis, a Maximum Entropy Method Analysis, a Random Decrement Analysis, a Hilbert Transform, a Shock Response Spectrum, a Wavelet Transform Analysis and a Damping Estimation Analysis;
    (b) obtaining amplified digital data signal from at least one device;
    (c) conveying said data signal to a means for analyzing said data;
    (d) filtering and removing signal noise from said digital data signal using band stop filters;
    (e) obtaining a filtered signal;
    (f) locating frequencies having magnitudes greater than eight standard deviations above a mean frequency amplitude to remove said signal noise;
    (g) displaying said signal; and
    (h) storing said signal in a means for data storage.

2. A method of detecting the health of a structure as recited in claim 1, and further comprising using said Power Spectral Density Analysis and detecting component frequencies from said filtered signal.

3. A method of detecting the health of a structure as recited in claim 2 wherein said Spectral Analysis further comprises adding frequencies to said filtering step and reducing effects of transients and other error sources.

4. A method of detecting the health of a structure as recited in claim 3 wherein said Root Mean Square Analysis further comprises tracking magnitudes of energy absorbed by said structure, tracking said structure's inability to dissipate existing energy, creating a root mean square value on said energy absorption and dissipation and showing increases in magnitude of said root mean square value.

5. A method of detecting the health of a structure as recited in claim 4, wherein said Signal Bandwidth Index Analysis further comprises the steps of:
    (a) initially modeling a single solid system of said structure having a frequency; and
    (b) monitoring and comparing vibrations caused by transformation of said structure, due to fire, into loosely connected systems having a greater range of frequency bandwidth.

6. A method of detecting the health of a structure as recited in claim 5, wherein said Maximum Entropy Method Analysis further comprises evaluating said filtered signal having a short duration and high sample rate using an inversion technique and calculating a damping measure by determining the bandwidth of said maximum entropy.

7. A method of detecting the health of a structure as recited in claim 6, wherein said Random Decrement Signature Analysis further comprises averaging time data of a dynamic system, averaging out initial velocities and excitations and leaving response of said structure due to initial displacement.

8. A method of detecting the health of a structure as recited in claim 7, wherein said Random Decrement Signature Analysis further comprises the steps of:
    (a) utilizing a block of recent data from said filtered signal;
    (b) passing said block through a digital bandpass filter;
    (c) determining a threshold level for said block;
    (d) diminishing crossing values; and
    (e) averaging said crossing values to determine said structures' stability.

9. A method of detecting the health of a structure as recited in claim 8 wherein said Hilbert Transform Analysis further comprises using said Random Decrement Signature Analysis to determine said structure's damping values.

10. A method of detecting the health of a structure as recited in claim 9 and utilizing said Shock Response Spectrum Analysis and identifying dominant resonant activity.

11. A method of detecting the health of a structure as recited in claim 10 wherein said Wavelet Transform Analysis further comprises using a wavelet function, matching decaying oscillations of said Random Decrement Signature and determining points of highest intensity.

12. A method of detecting the health of a structure as recited in claim 11 wherein said Damping Estimate Index Analysis further comprising utilizing a −3 dB bandwidth damping value, a damping value from said Hilbert Transform, a damping value from a Log Decrement analysis, and a damping value from a Wavelet Intensity Ratio and determining when said structure will reach a region of instability.

13. A method of detecting the health of a structure as recited in claim 12, wherein said Health of Burning Structures system further comprises a Weighted Collapse Index, and deriving said Index by utilizing weighted averages of at least one of said Power Spectral Density Analysis, said Root Mean Square Analysis, said Signal Bandwidth Analysis, said Maximum Entropy Method Analysis, said Random Decrement Analysis, said Hilbert Transform, said Shock Response Spectrum, said Wavelet Transform Analysis and said Damping Estimation Analysis.

* * * * *